US011748774B1

(12) United States Patent
Dalal

(10) Patent No.: US 11,748,774 B1
(45) Date of Patent: Sep. 5, 2023

(54) SYSTEM AND METHOD FOR A SOCIAL MEDIA MANAGEMENT, PUBLISHING AND MARKETING CAMPAIGN COLLABORATION PLATFORM

(71) Applicant: VIRALITY MEDIA, INC., Redwood City, CA (US)

(72) Inventor: Rachin Dalal, Redwood City, CA (US)

(73) Assignee: Virality Media, Inc., Redwood City, CA (US)

(*) Notice: Subject to any disclaimer, the term of this patent is extended or adjusted under 35 U.S.C. 154(b) by 0 days.

(21) Appl. No.: 17/945,215

(22) Filed: Sep. 15, 2022

Related U.S. Application Data

(60) Provisional application No. 63/314,498, filed on Feb. 28, 2022.

(51) Int. Cl.
| | |
|---|---|
| *G06Q 30/02* | (2023.01) |
| *G06Q 30/0204* | (2023.01) |
| *G06Q 50/00* | (2012.01) |
| *G06Q 30/0251* | (2023.01) |
| *G06Q 30/0201* | (2023.01) |

(52) U.S. Cl.
CPC ..... *G06Q 30/0205* (2013.01); *G06Q 30/0201* (2013.01); *G06Q 30/0269* (2013.01); *G06Q 50/01* (2013.01)

(58) Field of Classification Search
CPC .......... G06Q 30/0205; G06Q 30/0201; G06Q 30/0269; G06Q 50/01
See application file for complete search history.

(56) References Cited

U.S. PATENT DOCUMENTS

| | | | | |
|---|---|---|---|---|
| 10,210,542 | B2* | 2/2019 | Bass | G06Q 30/0252 |
| 10,684,738 | B1* | 6/2020 | Sicora | G06F 16/435 |
| 2011/0252320 | A1* | 10/2011 | Arrasvuori | G06F 1/1626 |
| | | | | 715/810 |
| 2011/0258561 | A1* | 10/2011 | Ladouceur | H04L 51/52 |
| | | | | 715/753 |
| 2014/0033262 | A1* | 1/2014 | Anders | H04N 21/2343 |
| | | | | 725/116 |
| 2014/0149219 | A1* | 5/2014 | Redfern | G06Q 50/01 |
| | | | | 705/14.58 |
| 2017/0024110 | A1* | 1/2017 | Xu | H04N 5/772 |
| 2018/0039644 | A1* | 2/2018 | Bonanni | G06F 16/958 |
| 2018/0047038 | A1* | 2/2018 | DeLuca | G06Q 30/0205 |
| 2018/0204243 | A1* | 7/2018 | Haaland | G06Q 30/0251 |
| 2020/0089811 | A1* | 3/2020 | Liu | G06F 3/0482 |
| 2021/0150541 | A1* | 5/2021 | Gurbuxani | G06Q 30/0242 |

OTHER PUBLICATIONS

"Geo-targeting in Social Media: Geotarget posts on Twitter, Instagram, Facebook, and LinkedIn" et al. (published Sep. 11, 2021 on https://blog.circleboom.com/geo-targeting/) (Year: 2021).*
"Geo-targeting in Social Media: Geotarget posts on Twitter, Instagram, Facebook, and LinkedIn" (published Sep. 11, 2021 on https://blog.circleboom.com/geo-targeting/) (Year: 2021).*

\* cited by examiner

*Primary Examiner* — James M Detweiler

(57) ABSTRACT

The invention generally relates to systems and methods for an interactive platform which facilitates the management of social media accounts and content across multiple social media networks, and which facilitates collaboration between influencers and brand owners with respect to social media marketing, advertising, and content publishing.

13 Claims, 23 Drawing Sheets

SYSTEM AND METHOD FOR A SOCIAL MEDIA MANAGEMENT, PUBLISHING AND MARKETING CAMPAIGN COLLABORATION PLATFORM

CROSS REFERENCE TO RELATED APPLICATION

This application claims the benefit of U.S. Provisional Patent Applications No. 63/314,498 entitled "SYSTEMS AND METHODS FOR A CONSOLIDATED SOCIAL MEDIA PLATFORM MANAGEMENT SYSTEM—THE SOCIAL PLATFORM BY VIRALITY MEDIA" filed on Feb. 28, 2022, which is commonly owned, the disclosure of which is incorporated herein by reference in its entirety.

BACKGROUND

Field of the Invention

The present invention generally relates to systems and methods for a robust, comprehensive, and interactive platform which facilitates the management of social media accounts and content across multiple social media networks, and which facilitates collaboration between influencers and brand owners with respect to social media marketing, advertising, and content publishing.

Description of Related Art

In recent years social media has become a popular channel for businesses and consumers to interact online (i.e., on the Internet). Social media has significantly affected the way businesses aim to interact with their customers, fans, and potential consumers online, as consumers are increasingly turning to social media networks to research, learn about, and browse products and services. For businesses, this ever increasing shift from traditional brick and mortar exposure has meant that marketing strategies must be adapted to reach consumers online. One such strategy that businesses utilize is influencer marketing. Influencer marketing is an innovative approach to reach new audiences and consumers online, namely via social media networks. An influencer is a user that generates content and shares that content to their following users on a social media network, such as, for example, Facebook®, Instagram®, Twitter®, and the like. Influencers typically have a consistent message or theme (i.e., home decor, fashion, comedy, instructional content, etc.) throughout their shared content, a loyal following of users and high audience engagement. An example of influencer marketing is when an influencer is compensated by a business to serve as a brand advocate in order to promote a product or service to the influencer's followers.

Thus, influencers have the ability to alter the behavior of other users, namely, their followers, and may have the ability to reach many other users based on the number of followers they have across a variety of social media networks. Business, such as retailers, consumer product companies, event managers, and others are interested in identifying influencers due to their ability to inexpensively reach a large group of potential consumers with a single social media post. For example, if a business is able to provide a positive experience to, or solve a problem for, an influencer, the influencer may, independently or through some form of compensation by the business, share their experience with their followers. When this happens, the business amplifies the positive experience of one consumer to potentially thousands or hundreds of thousands of people. Businesses are attracted to this method of spreading goodwill because of a) the genuine nature of messages from influencers who presumably has an established level of trust with their followers; and b) the relatively low cost of distribution compared to traditional forms of advertising, such as paid placement, pay-per-click, and the like.

The current state of influencer marketing methods and systems is such that a business has to reach out via email or personal contact to an individual influencer, without any insight to the audience that follows that influencer. Reaching out to each individual influencer via email or personal contact is a time-consuming and complex process. Time is spent gathering identification information about the influencer and about their followers, waiting for the influencer to respond back to messages, communicating and clarifying marketing campaign requirements, coordinating the form and content for a marketing campaign, reviewing, and editing draft content, scheduling the publication of content, and facilitating payment to influencers in a secure and trusted fashion.

Currently, there is no scalable solution in place for businesses to reach, engage, and retain influencers in an intuitive, targeted fashion. The present invention provides systems and methods to facilitate more efficient and effective collaboration between businesses and influencers, as well as streamlined publishing and distribution of content across multiple social media networks.

Additionally, there is no current scalable solution for collecting and analyzing data from an influencer across multiple social media networks. Furthermore, obtaining information about the audience following an influencer is also a cumbersome and time-consuming and complex exercise for the same reason. The audience of an influencer consists of followers who themselves have followers. Data relating to each and every one of these followers is important as it allows a business to fine tune their marketing campaign to target a specific audience, and ultimately to an audience demographic they would like to promote their product or service to.

The present invention provides a system and method of influencer (and follower) analysis to rank the commercial value, reach, and engagement of an influencer and their followers more accurately, particularly based on certain demographics relevant to a business' target audience.

Furthermore, creating and publishing content to multiple social media networks is currently a highly manual, time consuming, and complex task, since many social media networks have different requirements and guidelines for publishing content. For example, Twitter® only allows 140-second duration videos to be uploaded and published, whereas TikTok® has a 180-second limit. Furthermore, certain social media networks only allow pictures to be uploaded, whereas others allow several multimedia types, including text, links, pictures, audio, videos, and the like. In addition, uploading content and interactions to various online metaverses is an equally time consuming and complex activity, especially since each metaverse has its own rules of engagement and membership behavior guidelines.

The present invention provides an improved system and method for a singular platform that facilitates the editing and publishing of content across multiple social media networks and metaverses, regardless of the various different publishing guidelines which may exist for content across these social media networks and metaverses.

SUMMARY

In one embodiment, the invention relates to a system comprising: a server including one or more processors;

memory coupled to the server, the memory storing instructions that, when executed by the one or more processors, cause the system to perform: receiving, by a content scheduling engine, digital content from a content creator, the content scheduling engine communicatively coupled to the server; receiving, by the content scheduling engine, at least one target audience demographic from the content creator; analyzing, by a matching engine, the at least one target audience demographic to identify target users, the matching engine communicatively coupled to the server; generating, by the matching engine, a priority list of identified target users; and publishing, by the content scheduling engine, the digital content to the identified target users according to the priority list.

In another embodiment, the invention relates to a method implemented by a server including one or more processors and storage media storing machine-readable instructions, wherein the method is performed using the one or more processors, the method comprising: receiving, by a content scheduling engine, digital content from a content creator, the content scheduling engine communicatively coupled to the server; receiving, by a matching engine from a brand owner, criteria related to a social media marketing campaign, the matching engine communicatively coupled to the server; generating, by the matching engine, at least one influencer matching the criteria; facilitating, by a collaboration engine, a collaboration related to the social media marketing campaign between the brand owner and the at least one influencer, the collaboration engine communicatively coupled to the server; receiving, by the content scheduling engine, at least one geographic demographic by the brand owner; analyzing, by a matching engine, the at least one geographic demographic to identify target users; generating, by the matching engine, a priority list of identified target users; and publishing, by the content scheduling engine, the digital content to the identified target users according to the priority list.

In yet another embodiment, the invention relates to a system comprising: a server including one or more processors; memory coupled to the server, the memory storing instructions that, when executed by the one or more processors, cause the system to perform: receiving, by a content scheduling engine, digital content from a content creator, the content scheduling engine communicatively coupled to the server; receiving, by the content scheduling engine, at least one geographic demographic from the content creator; analyzing, by a matching engine, the at least one geographic demographic to identify target users, the matching engine communicatively coupled to the server; generating, by the matching engine, a geographic priority list of identified target users; and publishing, by the content scheduling engine, the digital content to the identified target users according to the geographic priority list.

BRIEF DESCRIPTION OF THE DRAWINGS

These and other embodiments of the disclosure will be discussed with reference to the following exemplary and non-limiting illustrations, in which like elements are numbered similarly, and where.

DEFINITIONS

Figure 1:
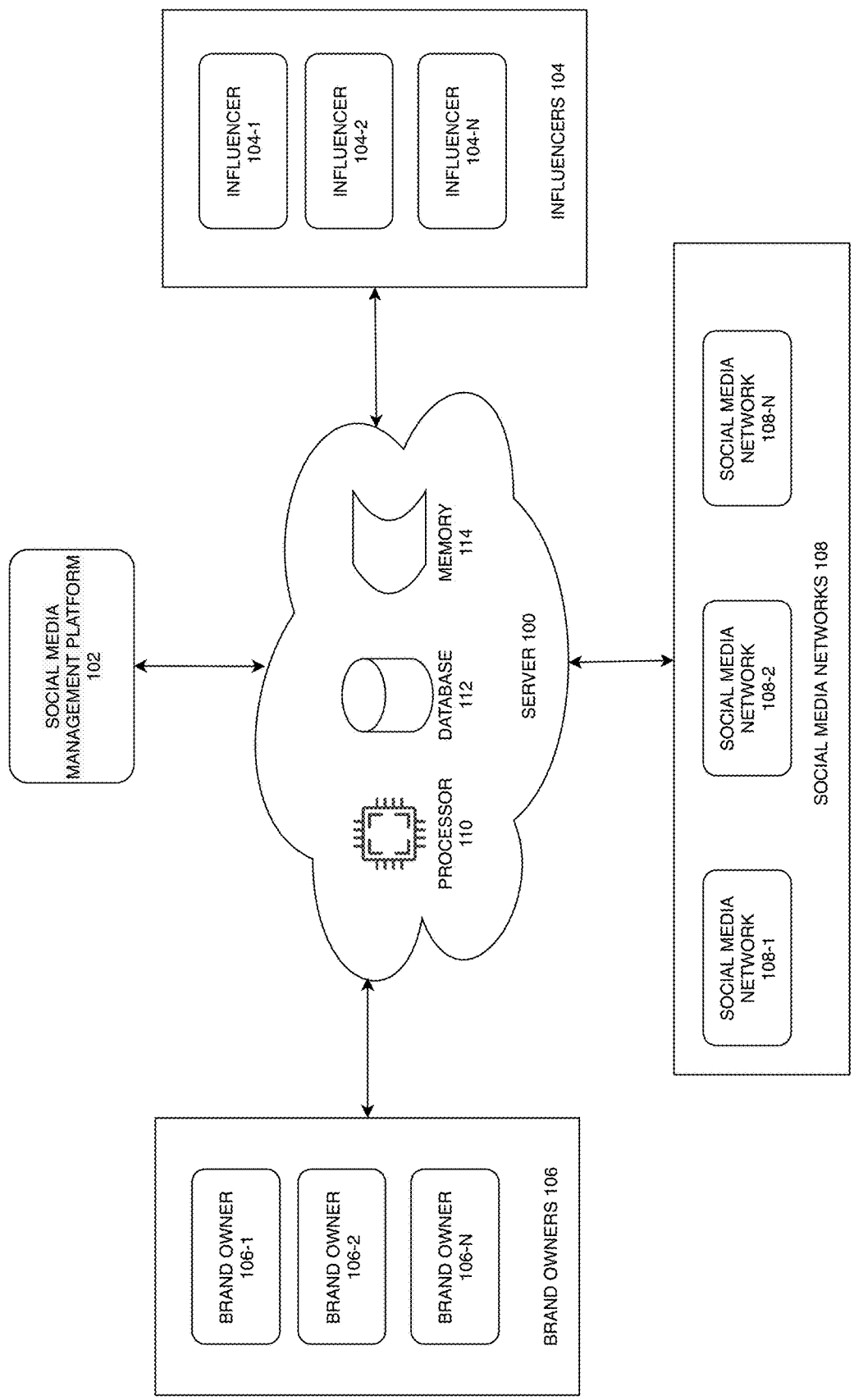
FIG. 1 shows an exemplary block diagram of a network architecture utilized by a social media management platform, according to an embodiment of the present invention.

The following definitions are meant to aid in the description and understanding of the defined terms in the context of the present invention. The definitions are not meant to limit these terms to less than is described throughout this application. Such definitions are meant to encompass grammatical equivalents.

As used herein, the term "social media network" can refer to, for example, any computer platform, website, computer application, and the like, that that indicates relationships between individuals, businesses, communities, and/or groups, such as entities who share, post, comment on, and distribute information related to interests, activities, backgrounds, job opportunities, and/or real-life connections.

As used herein, the term "metaverse" can refer to, for example, a virtual-reality space, or a fully immersive three-dimensional or two-dimensional space, in which users can inhabit, traverse within, and/or interact with, a computer-generated environment and other users.

As used herein, the term "influencer" can refer to, for example, a user that generates content and shares that content to their following users on a social media network, such as, for example, Facebook®, Instagram®, Twitter®, and the like. Influencers typically have a consistent message or theme (i.e., home decor, fashion, comedy, instructional content, etc.) throughout their shared content, a loyal following of users and high audience engagement. An influencer is typically determined to have the ability to influence the behavior of other users or may have the ability to reach many other users based on the number of followers or friends they have on a variety of social media networks.

As used herein, the term "brand owner" can refer to, for example, an entity or individual that has a vested interest in a brand, that wishes to preserve the integrity of a brand, and/or that owns, licenses, or otherwise has a financial interest in a brand.

As used herein, the term "follower" can refer to, for example, to a first user account associated with one or more social media networks that follows, tracks, befriends, or subscribes to a second user account associated with the social media network, such that content posted by the second user account is published for viewing by the first user account. For example, when a first user follows a second user account, the first user (i.e., the follower) will receive content posted by the second user account. In some cases, a follower engages with the content posted by the other users. A follower can also include a user who is not currently following a particular user account, but who may follow that user account after viewing published content, a marketing campaign, content, and the like.

As used herein, the term "content" means any form of electronic or digital content, media, compilations, files, streaming data, and the like. This includes, but is not limited to, video, images, animations, audio, slideshows, text, web- or hyper-links, and any combination thereof, and the like.

As used herein, the terms "content creator" and "content creators" can refer to, for example, influencers, brand owners, and others who create user-generated, original, proprietary, unique, derivative, fair use, work-for-hire, freelance, and/or targeted content, media, advertisements, promotions, e-commerce offerings, blogs, copy, and the like for publishing and distribution online.

As used herein, the terms "publish", "published", and "publishing" can refer to, for example, distributing, placing, displaying, streaming, posting, sharing, tweeting, and otherwise making content available for displaying, viewing, and/or downloading on at least one social media network.

As used herein, the terms "engage", "engagement", and "engagement activity" can refer to, for example, follower and following data, re-posting, re-tweeting, re-sharing, commenting on, and/or liking/disliking content, and click-through rates, and combinations thereof, as well as trends, analytics, and data generated therefrom.

As used herein, the term "artificial intelligence" can refer to, or can incorporate, for example, machine learning, deep-learning, supervised learning, unsupervised learning, semi-supervised learning, reinforced learning, fuzzy logic, neural networks, historical data and pattern analysis, any combination thereof, and the like.

As used herein, the term "digital currency" can refer to, for example, digital currency and/or virtual currency that may be unregulated or regulated, cryptocurrency, electronic tokens or coins, virtual money, proprietary or closed virtual currencies, public or open virtual currencies, and any regulated or unregulated non-fiat currency.

As used herein, the term "distributed ledger" can refer to, for example, a shared ledger, a block lattice, a hash-graph network, a blockchain network, and various distributed ledger technology ("DLT"), which can consist of a consensus of replicated, shared, and synchronized digital data geographically spread across multiple servers, networks, sites, countries, or institutions, with or without a central administrator or centralized data storage.

As used herein, the term "computing device" can refer to, for example, mobile phones, portable media players, desktop computers, laptop computers, netbooks, smartphones, tablet computers, wearable devices, "smart" watches, "smart" bracelets, "smart" necklaces, enhanced vision devices and systems, augmented vision headsets/glasses, internet-connected streaming media devices, any combination thereof, and the like.

As used herein, the term "engine" can refer to hardware components, software components, such as source code, packages, libraries, algorithms, and the like, as well as combinations therein.

As used herein, the term "network" can refer to, for example, the Internet, a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (i.e., personal area network (PAN), home area network (HAN), to name a couple of alternatives) a wireless network, a cellular network, a landline network, and/or a short-range connection network (i.e., such as Bluetooth, Zigbee, infrared, and the like). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

DETAILED DESCRIPTION

It should be understood that aspects of the present invention are described herein with reference to the figures, which show illustrative embodiments. The illustrative embodiments herein are not necessarily intended to show all embodiments in accordance with the present invention, but rather are used to describe a few illustrative embodiments. Thus, aspects of the present invention are not intended to be construed narrowly in view of the illustrative embodiments. In addition, although the present invention is described with respect to its application for management of digital content across social media networks, it is understood that the present invention could be implemented in any setting where digital media is promoted or shared, such as within virtual worlds, augmented and mixed reality environments, as well as streaming and/or interactive video and television platforms.

FIG. 1 shows an exemplary block diagram of a network architecture utilized by a social media management platform, according to an embodiment of the present invention. The network architecture includes a server 100, a social media management platform 102 coupled to the server 100 via network, influencers 104 (individually, influencers 104-1 to 104-N) coupled to the server 100 via a network, brand owners 106 (individually, brand owners 106-1 to 106-N) coupled to the server 100 via a network, and social media networks 108 (individually, social media networks 108-1 to 108-N) coupled to the server 102 via a network.

The server 100 in intended to represent a computer system or network of computer systems, which can include or be implemented as a specific purpose computer system for carrying out the functionalities of the present invention. In general, the server can include a processor 110, a database 112, and a memory 114, with a device such as a bus (not shown) coupling the processor 110 to the database 112 and the memory 114. The processor 110 can be, for example, a general-purpose central processing unit (CPU), such as a microprocessor, or a special-purpose processor, such as a microcontroller.

The memory 114 of the server 100 can include, by way of example but not limitation, random access memory (RAM), such as dynamic RAM (DRAM) and static RAM (SRAM). The memory 114 can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into the memory 114 by way of a bus coupled to non-volatile storage. Non-volatile storage can be local, remote, or distributed, but is optional because systems can be created with all applicable data available in the memory 114.

Software in the server 100 is typically stored in non-volatile storage, and can include, for example, operating system software and application software. For software to run, if necessary, it is moved to a computer-readable location appropriate for processing, and for illustrative purposes of the present invention, that location is referred to as memory 114. Even when software is moved to the memory 114 for execution, the processor 110 will typically make use of hardware registers to store values associated with the software, and a local cache that, ideally, serves to speed up execution. As used herein, software is assumed to be stored at an applicable known or convenient location (from non-volatile storage to hardware registers) where the software is referred to as "implemented in a computer-readable storage medium." The processor 110 is "configured to execute the software" when at least one value associated with the software is stored in the memory 114 readable by the processor 110.

In one example of operation, the server 100 can be controlled by operating system software, which is software that includes a file management system, such as a disk operating system. One example of operating system software is the family of operating systems known as Windows® from Microsoft Corporation, and their associated file management systems. Another example of operating system software with its associated file management system software is the Linux® operating system and its associated file management system. The file management system is typically stored in the non-volatile storage and causes the processor 110 to execute the various acts required by the operating system software to input and output data and to store data in the memory 114, including storing files in the database 112. In an embodiment, the database 112 can be in the form of a distributed ledger.

In an embodiment, the application software includes executable software that enables operation of the social media management platform 102, and as well as the functionality of its various engines, data stores, and components.

The bus of the server 100 can couple the processor 110 to at least one network interface (not shown). The network interface can be for input and/or output (I/O) devices, modems, or networks. Modems can include, by way of example but not limitation, an analog modem, an IDSN modem, a cable modem, and other modems. The network interface can include, by way of example but not limitation, a token ring interface, a satellite transmission interface (i.e., "direct PC"), or other network interface for coupling the server 100 to computing devices operated by the influencers 104 and brand owners 106, as well as for coupling the server 100 to the social media networks 108.

The server 100 can be compatible with, or implemented as part of, a cloud-based computing system. A cloud-based computing system is a system that provides virtualized computing resources, software and/or information to client devices, such provided by Amazon Web Services® and the like. The computing resources, software and/or information can be virtualized by maintaining centralized services and resources that the server 100 can access over a network interface. As used herein, a cloud-based computing system can refer to an on-demand cloud-computing platform, a "serverless" cloud-computing platform, and/or another cloud-computing platform. The cloud-based computing system can require a subscription for services, or it can use a utility pricing model. In an embodiment, content creators can access the engines, data, and components described herein of the cloud-based computing system through a web browser, software application, or other container application located on their computing device.

All or portions of the software and/or functionalities of the social media management platform 102 can be distributed across multiple computing devices and need not be restricted to just the server 100. In this embodiment, the server 100 can execute functionalities and/or engines that content creators access through a web browser, software application, or container application without having the functionalities and/or engines installed locally on their computing devices.

In another embodiment, functionality of the social media management platform 102 can be performed by one or more servers (i.e., a cloud-based computing systems, edge servers, and the like) and/or other computing devices, such as software installed on, and executing on computing devices utilized by influencers 104 and brand owners 106.

The networks (indicated by arrows between the server 100 and the social media management platform 102, the influencers 104, the brand owners 106, and the social media networks 108) can be an applicable communications network, such as the Internet or an infrastructure network.

In an embodiment, influencers 104 and brand owners 106 each utilize computing devices that are communicatively coupled to the server 100 in order to utilize the social media management platform 102. The computing devices communicate with the server 100 via respective connections. In an embodiment, the computing devices can be any computing device capable of connectivity to the server 100 via a network. In an embodiment, the computing devices include a display that allows a graphical user interface ("GUI") for the social media management platform 102 to be accessed and manipulated. In an embodiment, the computing devices include software, such as a smartphone application, distributed application, a web-based application, a cloud-based application, and the like (hereinafter, collectively, the "Virality Media Software"), where content creators can access and utilize the social media management platform 102.

In an embodiment, social media networks 108 are communicatively coupled to the server 100 via a network. The server 100 may utilize an application programming interface (API) which allows the server 100 to communicate with each social media network 108. Each social media network may require the server 100 to utilize a different API in order to communicate with, and receive data from, each of the social media networks 108. For example, the server 100 can utilize separate API calls to retrieve account information related to influencers 104 and brand owners 106 from the social media networks 108. In another embodiment, the server 100 may utilize alternatives to APIs, such as, for example, webhooks, remote procedure calls, and the like, to communicate with, and receive data from, each of the social media networks 108.

In an embodiment, the social media management platform 102 provides a robust and interactive GUI that facilitates the management of social media accounts of influencers 104 and brand owners 106, and which allows brand owners 106 to search for and collaborate with influencers 104, based on various social media analytics associated with each influencer 104, as described herein.

In an embodiment, influencers 104 can be, for example, individuals, celebrities, subject matter experts, bloggers, athletes, online personalities, and the like. In a preferred embodiment, influencers 104 are entities that have a threshold number of followers on at least one social media network 108. In a preferred embodiment, the threshold number of followers is at least 5,000 followers on at least one social media network 108. Influencers 104 can leverage their followers on one or more social media networks 108 in order to promote content via social posts, images, videos, advertisements, and commentary. Such content can be original content created by an influencer 104, or can be third-party content shared by an influencer 104. With the growing popularity and adoption of promoting products and services on social media networks 108, influencers 104 typically desire to monetize this leverage by offering their services to brand owners 106 in exchange for compensation.

In an embodiment, brand owners 106 can be, for example, a business, such as a large business or enterprise, a small or medium sized enterprise or business ("SMBs"), a not-for-profit entity, an academic institution, a government institution, an industry organization or alliance, influencer marketing companies, public relations companies, advertising agencies, and the like. In addition, brand owners 106 can include individuals such a designers, artists, authors, actors/actresses, athletes, and the like. In an embodiment, brand owners 106 desire to promote their brands on one or more social media networks 108 by utilizing the services of influencers 104, and in exchange, compensate influencers 104 for such services.

In an embodiment, social media networks 108 can include, but are not limited to, those networks known by trade names Facebook®, YouTube®, Instagram®, Snapchat®, TikTok®, Twitter®, LinkedIn®, WhatsApp®, WeChat®, Tumblr®, Pinterest®, Google+®, Yammer®, Hi5®, Badoo®, QQ®, Kuaishou®, Tuenti®, Cyworld®, weibo®, and renren®, to name a few popular platforms used globally and regionally. The social media network 108 are not limited by these networks, and can include any platform, ecosystem, network, or computing environment that allows users to connect with each other, whether in a conventional, virtual, augmented, or mixed reality environment, including metaverses.

Figure 2:
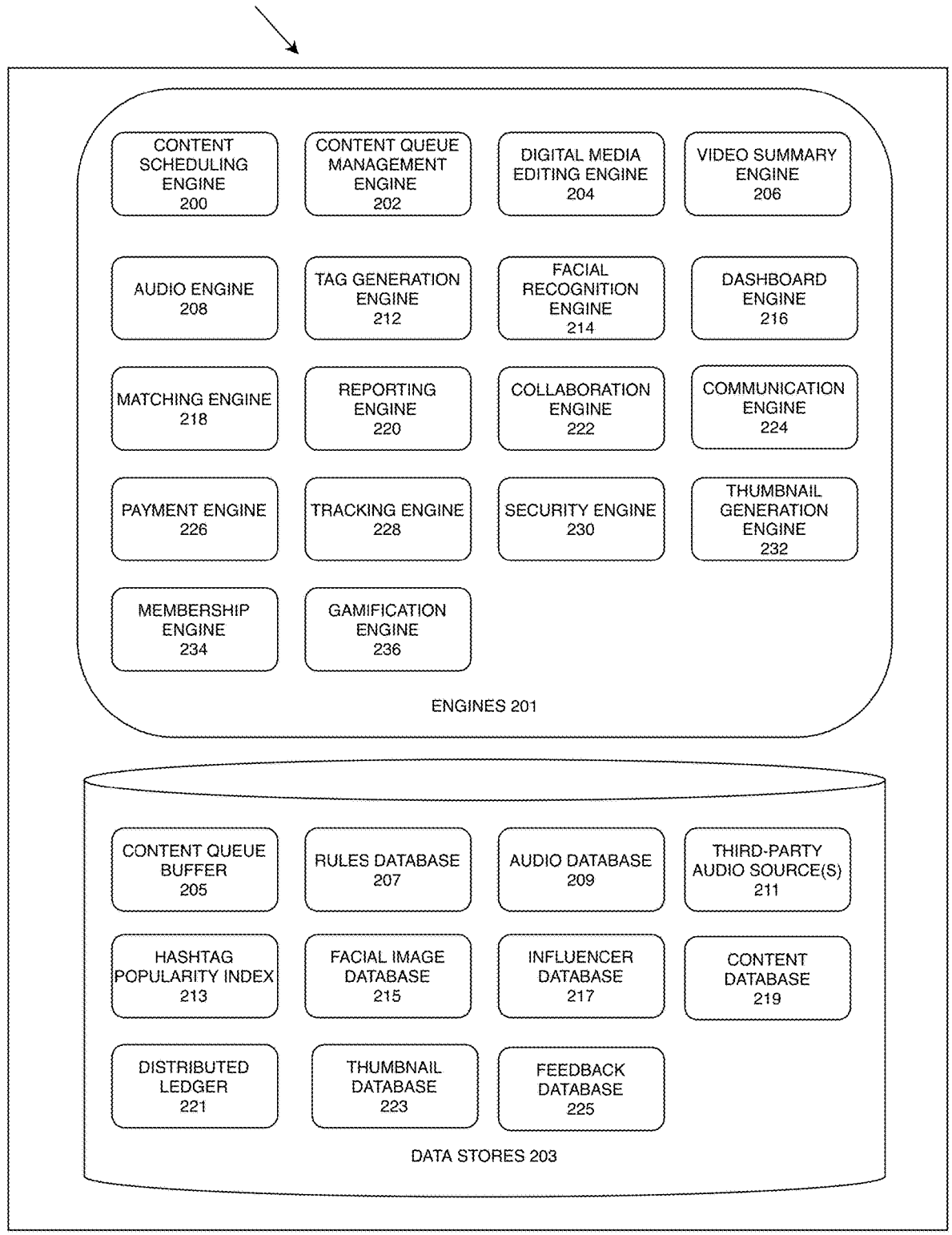
FIG. 2 shows an exemplary component diagram of the social media management platform, according to an embodiment of the present invention.

FIG. 2 shows an exemplary component diagram of the social media management platform 102, according to an embodiment of the present invention. In an embodiment, the social media management platform 102 includes engines 201 and data stores 203.

In an embodiment, content creators can access and use the social media management platform 102 and all the functionality provided by the engines 201 and data stores 203 as described herein via the Virality Media Software using their computing devices.

In an embodiment, the social media management platform 102 includes a content scheduling engine 200. The content scheduling engine 200 allows content creators to schedule when content is to be published on at least one social media network 108. For example, the content scheduling engine 200 allows content to be scheduled for publishing based on various rules or parameters, such as, for example:

(a) Publishing on a specific time and/or date. In an embodiment, content can be scheduled to be published on a specific time and date, on a specific date and at multiple times, on multiple dates at multiple times, etc.. In addition, the same content can be scheduled to be published on different social media networks 108 at different days and/or times. In yet another embodiment, content can be scheduled to be published based on a local time of the target audience. For example, if the target audience is working professionals, content can be scheduled to be published before and/or after working hours (i.e., before 8am local time or after 5 pm local time), or during lunch hours (i.e., between 11 am and 1 pm local time). Such targeted scheduling increases the likelihood that a target audience will engage with the content, versus being preoccupied with work during normal working hours. In an embodiment, the content scheduling engine 200 can provide suggestions as to the optimal timing for when particular content should be published, based on the time-demographics of a target audience.

In an embodiment, when content is scheduled to be published based on the local time of the target audience, then content can be published at different local times, but at the same temporal time (i.e., if content is to be published after working hours, target audience users located in New York City can receive content at 6 pm EST (which is 3 pm PST), and target audience users located in Los Angeles can receive the same content at 6 pm PST (which is 9 pm EST)).

(b) Publication by a specific social media account or accounts. In an embodiment, a specific influencer or brand owner social media account can be selected to publish the content. In another embodiment, multiple social media accounts can be selected to publish the content, either simultaneously, in random order, or in a predetermined order. For example, a first influencer's social media account can be scheduled to publish content at a first time, and a second influencer's social media account can be scheduled to publish that same, or similar, content at a second time.

(c) Publication based on the social media network. In an embodiment, a specific social media network 108 can be selected for where content is to be published. In another embodiment, multiple social media networks 108 can be selected where content is to be published, either simultaneously, in random order, or in a predetermined order. For example, content can be scheduled to be published on Facebook® at a first time, and that same content can be scheduled to be published on Twitter® at a second time. In another example, the content can be scheduled to be published on both Facebook® and Twitter® at the same time. In yet another example, the content can be scheduled to be published on Instagram® at a first time, and then published to additional social media networks 108 in a random order or a predetermined order.

Publication can also be based on the time-demographic of when users access a particular social media network 108. For example, content can be scheduled for normal working hours (i.e., 8 am to 5 pm local time) for publishing to LinkedIn®, as that platform is likely utilized by working professionals during daytime hours. Similarly, content can be scheduled for posting to other social media networks 108 such as Facebook® and Twitter® before and/or after working hours (i.e., before 8 am local time or after 5pm local time), or during lunch hours (i.e., between 11 am and 1 pm local time). In an embodiment, the content scheduling engine 200 can provide suggestions as to the optimal social media network(s) 108 where particular content should be published based on, for example, demographics of a target audience, follower engagement analytics, and the time of day for engagement of users for particular a social media network 108.

(d) Publication based on target audience demographics. In an embodiment, content can be scheduled to be published to social media user accounts which match at least one selected demographic information, such as a user age, sex, gender identity, interests, hobby, purchasing history, purchasing power, ethnicity, religious affiliation, political affiliation, social views (i.e., such as, for example, on gun control and gun rights, abortion, politics, race-related issues, and the like), employment status, career type, education level, socio-economic status, household size, marital status, geographic location, and the like. For example, content can be scheduled for publishing to social media user accounts associated with males aged 25 to 35 which have interests related to sports, or to social media user accounts associated with single or unmarried females aged at least 40 years old who have children.

(e) Publication based on audience location. In an embodiment, content can be scheduled to be published based on a geographic demographic, such as social media user accounts residing in a specific location, such as a custom selected region or regions, town, city, state, country, and/or continent. For example, content can be scheduled for publishing to social media user accounts for users only in the U.S. and Canada, or to social media accounts for users only in Paris. In an embodiment, content can be scheduled to be published based on a geographic priority list. For example, the content creator can input an ordered priority list of countries based on where the target audience resides (i.e., 1—U.S. users/followers, 2—Canadian users/followers, 3—Japanese users/followers, etc.), and the content can be published in order according to the priority list.

(f) Publication based on target audience engagement activity. Engagement activity related to social media user accounts can be gathered from the social media networks 108 via APIs, as discussed herein. In an embodiment, content can be scheduled for publishing to social media user accounts having a threshold number or percentage engagement, such as, for example, re-posting, sharing, liking, commenting, or re-tweeting activity, either in general, or for content which matches a specific demographic criteria. For example, content can be scheduled for publishing to social media user accounts with a high likelihood to re-post content related to video games, or with a high likelihood to share content related to apparel. For the purposes of the present invention, the threshold number or percentage can be a relative number based on aggregate data of social media user accounts. In an embodiment, however, the threshold percentage for engagement is between 10% and 100%, and preferably at least 25%.

(g) Publication based on the content itself. In an embodiment, the content scheduling engine 200 can parse or analyze the content for tags, identifiers, text, audio, hyperlinks, expressions, metadata, watermarks, and the like, to extract key features. Key features can include data or information identifying or suggesting specific themes, topics, events, and/or issues, such as, for example, birthdays, anniversaries, religious holidays or events, inspirational content, motivational content, instructional content, and the like. For example, content related to birthdays can be scheduled for publishing to social media user accounts on user birthdays or in anticipation of an upcoming user birthday. In another example, content related to tennis instruction can be scheduled for publishing to social media user accounts associated with an interest in tennis. In yet another example, the content scheduling engine 200 can identify holiday specific identifiers in content, i.e., carved pumpkins for Halloween, decorated conifer trees and wreaths for Christmas, the throwing of colored powder for Holi, etc., and such content can be scheduled for publishing to social media user accounts which match the respective demographic criteria—young children for Halloween, Christianity for Christmas, and Asian Indian heritage or Hinduism for Holi, etc. Other examples of specific days which can be identified based on the content include, but are not limited to, Valentine's Day, Friendship Day, International Women's Day, April Fool's Day, Mother's Day, Father's Day, Grandparent's Day, Doctor's Day, etc., as well as major state, federal, and religious holidays.

In yet another embodiment, content can be scheduled for publishing to social media user accounts which follow a particular person, such as a celebrity. For example, if the content creator follows a celebrity, then the content scheduling engine 200 can schedule a post to be sent to each of the content creator's followers so that they can also be notified of the celebrity's birthday. The same workflow can be utilized for anniversary dates for celebrities and celebrity couples, for work anniversaries, or for product launch anniversaries (i.e., if a brand owner 106 wishes to promote a milestone such as selling a product for 10 years, etc.).

In an embodiment, the social media management platform 102 includes a content queue management engine 202. The content queue management engine 202 receives and stores content that has been scheduled for publishing by the content engine 200. In the event content is not scheduled for immediate publishing, the content can be placed into a content queue buffer 205 by the content queue management engine 202. The content queue management engine 202 allows queued content to be paused, deleted, and resumed (if previously paused), and it also allows the publishing schedule for the queued content to be modified.

In an embodiment, content that is scheduled for immediate publishing cannot be modified, paused, or deleted.

In the event that queued content is paused, the content queue management engine 202 allows the ability to resume the scheduled publishing. If the scheduled publishing time (as specified in the publishing schedule) has passed while the queued content was paused, then the content queue management engine 202 provides the following options to the content creator: (1) select another publishing time, as well as other criteria or parameters, (2) immediately publish the queued content, or (3) delete the queued content from the content queue buffer 205.

If, however, the scheduled publishing time has not passed while the queued content was paused, then the content queue management engine 202 provides the following options to the content creator: (1) publish the queued content as originally scheduled, (2) select another publishing time, as well as other criteria or parameters, (3) immediately publish the queued content, or (4) delete the queued content from the content queue buffer 205.

In an embodiment, the content queue management engine 202 allows queued content to be displayed in the order that it is scheduled to be published. In the event there are multiple queued content items, the position or order of each queued content can be selectively modified by the content creator, so that the publishing order of queued content can easily be modified.

In an embodiment, the social media management platform 102 includes a content editing engine 204. The content editing engine 204 provides various functionalities and tools that allow the editing of video, image, audio, and text content by the content creator prior to publishing such content to the social media networks 108. In an embodiment, for video editing, content creators can select a window or group of sequential or non-sequential video frames, and crop the video so that it conforms to required rules, such as file size or length limits, which may be imposed by a social media network 108.

In an embodiment, the content editing engine 204 provides automatic editing functions based on which social media network 108 the content will be published to. For example, for a particular content, such as a video or audio clip, the content editing engine 204 analyzes the content and compares it with the required rules for a particular social media network 108, such as a minimum or maximum file size or length. If the content is not within the required rules (i.e., a threshold size or length required by a selected social media network 108), then the content editing engine 204 automatically crops or scales the content to be within the threshold.

In an embodiment, if a content creator selects multiple social media networks 108 where the content is to be published, and if those selected social media networks 108 have different required rules, then different versions of the content are automatically generated by the content editing engine 204 for each social media network 108 that has different required rules. Each respective version of the content is then scheduled for publishing to the appropriate social media network by the content scheduling engine 200.

In an embodiment, the content editing engine 204 can obtain the required rules (i.e., minimum and maximum file sizes, lengths, quality, frame rates, pixel count, and the like) via the APIs from each social media network 108. Thus, content creators are not required to research and confirm the various different required rules which may exist across different social media networks 108, and which may change from time-to-time without notice. In another embodiment, the required rules for each social media network 108 can be manually adjusted by content creators.

In an embodiment, the content editing engine 204 stores a required rules file for each social media network 108 in a rules database 207, which can be refreshed or updated in real-time by the content editing engine 204. In another embodiment, the rules database 207 can be updated by periodic or scheduled API calls or queries to each social media network 108 to determine if a respective required rule has been modified by a social media network 108.

For example, if an influencer 104 wishes to upload a video to a YouTube® account, (where there may be no size limit on videos that can be uploaded), and also selects to upload that same video to their TikTok® account which has a 180-second size limit for videos, then the content editing engine automatically overlays a 180-second editing window over the video. The influencer 104 can then slide the editing window to select a 180-second version of the video which can be uploaded to both the influencer's YouTube® and TikTok® accounts. Alternatively, only the 180-second version is uploaded to the influencer's TikTok® account, while the original full version of the video is uploaded to the influencer's YouTube® account.

In an embodiment, the content editing engine 204 further provides functionality for cropping and trimming videos and images, appending videos, adding subtitles or other text notations, metadata, graphics, and visual overlays, backgrounds, and effects (i.e., blur), adjusting color and picture properties, adding fade ins and fade outs, adding transition effects to videos and image slideshows, and the like.

In an embodiment, the social media management platform 102 includes a video summary engine 206. The video summary engine 206 can automatically generate, or facilitate the generation of, short-format videos from original video content. The short-format video is particularly useful for content creators wishing to publish content on, for example, YouTube® Shorts, Instagram® Reels, TikTok®, Twitter®, and Facebook®, among others, which have popular short-format video publishing channels.

In an embodiment, the video summary engine 206 utilizes image and video analysis and processing and/or artificial intelligence techniques to identify key frames from the video or image content. In an embodiment, the image and video analysis and processing can detect temporal and spatial events within content, and can utilize, for example, dynamic masking, flame and smoke detection, ego-motion estimation, motion detection, shape recognition, object detection, facial and human recognition, style detection, object tracking, object co-segmentation, and the like. The image and video processing can further include, but is not limited to, enhancement technologies such as denoising, image stabilization, unsharp masking, and super-resolution.

Key frames can be identified as event transition frames, event starting frames, event ending frames, frames with the same event (i.e., indicating a long event which may be important), and the like. In an embodiment, these key frames can be sequentially displayed to the content creator who can then select which key frames should be included for a short-format version of the video. Furthermore, the content creator can modify the order in which key frames appear in the short-format version of the video. The video summary engine 206 can determine if the selected key frames still allow the short-format version of the video to comply with the required rules of a social media network 108 where it may be published.

In another embodiment, the video summary engine 206 can automatically select the key frames for the short-format video by assigning rankings to the identified key frames. For example, the video summary engine 206 can apply a ranking to each key frame based on a detected occurrence, such as an event, persons, objects, and the like, in the key frame. The ranking itself is determined by a characteristic of the detected occurrence, for example, the number of people in a meeting room, the detection of animals or pets rather than persons, the temporal presence of objects, the temporal presence of persons, the volume or temporal presence of the audio, and the like. Similar to the user-selected short-format version generation, the video summary engine 206 can automatically select key frames which allow the short-format version of the video to comply with the required rules of a social media network 108 where it may be published.

In an embodiment, the social media management platform 102 includes an audio engine 208. The audio engine 208 allows audio to be inserted, modified, created, and otherwise managed for content. For example, the audio engine 208 allows content creators to insert audio tracks, such as music tracks, music clips, user-generated speech, computer-generated speech, pre-recorded audio, and the like, at selected timepoints or frames in the content. The audio engine 208 further allows content creators to edit the location of inserted audio, delete the inserted audio, and replace the inserted audio.

In an embodiment, the audio engine 208 includes, or is communicatively coupled to, an audio database 209 which contains license-free and/or royalty-free audio tracks that content creators can incorporate into their content. In another embodiment, the audio engine 208 is communicatively coupled to at least one third-party audio source 211, via, for example, an API. The third-party audio source 211 can be an external audio database or catalog, such as music catalogues provided by Soundstripe®, Epidemic Sound®, and the like, and/or a streaming audio service such as Spotify®, Apple Music®, Napster®, Amazon Music®, Deezer®, Feed.FM®, Pandora®, and the like. In an embodiment, the content creator can select multiple audio tracks for insertion into their content.

In an embodiment, the audio engine 208 allows content creators to search for audio tracks contained in the audio database 209, as well as audio tracks provided by the at least one third-party audio source 211.

In an embodiment, the audio engine 208 can suggest relevant audio tracks for addition to the content. For example, the audio engine 208 can utilize audio analysis and processing, image and video analysis and processing, and/or artificial intelligence techniques to detect occurrences, such as events, persons, objects, and the like, in the video. In an embodiment, the audio analysis and processing can include, but is not limited to, voice activity detection, speech recognition, speech-to-text technology, deepfake audio detection, and the like, using, for example, Hidden Markov Models (HMM), dynamic time-warping (DTW), denoising autoencoders, deep feedforward neural networks (DNN), and the like.

Based on the detected occurrence, the audio engine 208 can suggest relevant audio tracks. For example, if a birthday party is detected in the video, the audio engine 208 can suggest a birthday-themed audio track from the audio database 209 or third-party audio source 211. In an embodiment, the audio engine 208 can provide a list of suggested audio tracks from which the content creator can select for addition to the video, as well as suggested timepoints or frames for insertion of the audio tracks.

In another embodiment, if the audio engine 208 detects multiple occurrences within the video, then the audio engine 208 can suggest relevant audio tracks for each detected occurrence, as well as a suggested timepoint or frame for insertion of each audio track. For example, if a video includes both upbeat and happy scenes, as well as somber or scenes indicating sadness, then the audio engine 208 can suggest appropriate and relevant audio tracks for each set of scenes.

In yet another embodiment, the audio engine 208 can provide a graphical overlay or window of an audio track over the video, such that the length of the audio track can be matched appropriately to the length of the video. The graphical overlay of the audio track can be adjusted, slid, lengthened, or shortened by the content creator in order to position it at the desired location in the video, as well as ensure that the video to be published is completely or partially audio-enabled (i.e., there are no silent or discontinuous audio portions). In an embodiment, the graphical overlay allows the content creator to match the length of the audio track to the length of the video.

In an embodiment, the audio engine 208 can detect the audio within the content, and perform various audio processing functions on the detected audio. For example, the detected audio can be processed to automatically control gain, which functions to substantially maintain the output audio level at a given volume despite fluctuations in the original recorded audio or input audio. In addition, the detected audio can be processed to denoise the detected audio to remove background noise. In an embodiment, any suitable filtering mechanism or method can be applied to improve or enhance perceived audio quality in the detected audio.

In an embodiment, the social media management platform 102 includes a tag generation engine 212. Interaction between and among users is paramount to facilitating communication and information sharing within social media networks. To facilitate such communication and sharing, content, posts and messages in social media networks can be categorized, tagged, or labeled in some way to allow selection and display based on topic, theme, interest, or other criteria. For example, Twitter® employs hashtags, short phrases preceded by the pound or hash character (#), allowing content creators to select content using these tags. Selecting appropriate, relevant, and popular hashtags can be challenging for content creators, given the myriad of terms that can be utilized, and the lack of engagement analytics surrounding hashtags.

In an embodiment, the tag generation engine 212 can utilize image and video analysis and processing, audio analysis and processing, and/or artificial intelligence techniques to identify the subject matter of the content based on, for example, one or more keywords, subjects, themes, events, products, persons, objects, metadata, location information, and the like, identified in the content. Based on the determined subject matter, the tag generation engine 212 can recommend or suggest appropriate hashtags to the content creator. In an embodiment, the tag generation engine 212 can automatically apply the recommended hashtags to the content.

In an embodiment, the tag generation engine 212 can analyze hashtag data received from the social media networks via the APIs to determine popular, unpopular, and trending hashtags. The tag generation engine 212 can maintain a hashtag popularity index 213, and can cross-reference the hashtag popularity index 213 when determining which hashtags to recommend for a particular content. For example, if the tag generation engine 212 determines that the subject matter of content relates to a wedding anniversary, it may generate a short-list of hashtags such as Move, #wedding, #anniversary, and the like. This short-list can be compared to the hashtag popularity index 213 to determine which hashtags would most effectively promote the content, and those most effective hashtags from the short-list are suggested to the content creator.

In an embodiment, the tag generation engine 212 can specifically receive data on popular as well as trending hashtags. For example, "popular" hashtags can include hashtags which are consistently, over time, widely used, such that they are statically popular. For example, the hashtags #love, #family, #happiness, etc. could be considered popular hashtags are their use may not vary significantly over time or from month-to-month.

A "trending" hashtag, on the other hand, can be determined based on statistical data exhibiting the rise and or fall in usage of a particular word, term, phrase, etc. in a specific recent time period, such as within the last 24 hours, the last week, the last month, and the like. In an embodiment, popular and trending hashtags can be determined based on a particular geographic region as well as a time period. For example, the hashtag #USOpen may be a trending hashtag for New York City during the months of Aug. and Sep. when the U.S. Open tennis tournament is held in Queens, N.Y.. However, the #USOpen hashtag may not be a popular hashtag since its use may decline in the months following the event.

In an embodiment, the tag generation engine 212 can maintain separate hashtag popularity index 213 for each social media network 108. In yet another embodiment, the tag generation engine 212 can utilize artificial intelligence techniques, such as machine learning over time, to continually update the hashtag popularity index 213.

In an embodiment, the social media management platform 102 includes a facial recognition engine 214. The facial recognition engine 214 identifies popular personalities, such as celebrities, athletes, politicians, socialites, and the like, from the content. Based on identified personalities, this information can be utilized by the tag generation engine 212 to determine and suggest appropriate hashtags for the content. In an embodiment, the facial recognition engine 214 compares detected facial features in content with an facial image database 215 that contains images of popular personalities. The detected facial features are compared against feature vectors of images in the facial image database 215 to determine a match.

In an embodiment, the facial recognition engine 214 utilizes image and video analysis and processing and/or artificial intelligence techniques to detect facial features from the video or image data. Such image and video analysis and processing can utilize, for example, local feature analysis (LFA), facial image normalization algorithms, geometric algorithms, photo-metric algorithms, human identification at a distance (HID) technology, three-dimensional recognition, and the like. In an embodiment, the facial recognition engine 214 can further employ gaze, iris, and facial expression analysis and recognition technology.

In an embodiment, the facial recognition engine 214 can utilize artificial intelligence techniques, such as machine learning over time, to add new images to, and fine-tune the tagging of existing images, in the facial image database 215.

In an embodiment, the facial recognition engine 214 can, over time, track frequently occurring persons and faces within a content creator's videos and images. Once a particular person/face appears in a threshold number of content, the facial recognition engine 214 prompts the content creator to tag the person (i.e., provide a name or identifier), and the images of the person are added to the facial image database 215. Upon detection of the person in subsequent content, the facial recognition engine 214 can automatically tag this person prior to publishing the subsequent content on social media networks 108.

In an embodiment, the social media management platform 102 includes a dashboard engine 216. The dashboard engine 216 provides content creators with a customizable and interactive dashboard or display of various metrics and analytics related to their content, both published and queued for publishing, as well as information related to collaborations with other content creators (i.e., status of collaborations, milestones, deadlines, payment status, etc.). In an embodiment, the dashboard engine 22 receives data from various engines 201, such as from at least one of the content scheduling engine 200, content queue management engine 202, video summary engine 206, audio engine 208, tag generation engine 212, facial recognition engine 214, tracking engine 228, collaboration engine 222.

The dashboard engine 216 utilizes data received the other engines 201 and data stores 203 in the social media management platform 102 to calculate metrics such as rates of engagement with published content, popularity and reach across various audience demographics, click-through rates across different social media networks 108, the number of likes/dislikes, the number of comments, the extent of engagement (i.e., re-posting, re-tweeting, re-sharing, commenting on, and/or liking/disliking content), the number of new followers linked to the published content, hashtag efficacy, and the like.

The dashboard engine 216 allows content creators to view various metrics based on at least the following criteria:
  (a) By published content type (i.e., videos, images, slideshows, memes, etc.).
  (b) By the social media network 108 to which content has been published.
  (c) By an account, such as an account owned by an influencer 104 or brand owner 106.
  (d) By audience demographics.
  (e) By geo-tagged locations where published content has had threshold engagement.
  (f) By content analytics, such as, but not limited to, click-through rates across different social media networks 108, the number of likes/dislikes, the number of comments, the extent of engagement (i.e., re-posting, re-tweeting, re-sharing, commenting on, and/or liking/disliking content), the number of new followers linked to the published content, hashtag efficacy, and the like.

In addition, content creators can select multiple metrics to obtain narrower insights into the data. For example, the dashboard can display metrics for only videos published to Instagram® and which are viewed by users or followers between the ages of 25 and 35 years old, and who reside in New York City. The above is an exemplary list of metrics that can be generated and displayed by the dashboard engine 216, and is not intended to be a limiting or exhaustive list of metrics.

In an embodiment, the social media management platform 102 includes a matching engine 218. The matching engine 218 allows content creators to search the various data related to influencers 104 located within the data stores 203. In an embodiment, data related to each influencer 104, such as previously published content, follower information, collaboration history, feedback and/or reviews from other content creators, profile information from social media networks 108, analytics and trends, engagement metrics across multiple social media networks 108, and the like, can be stored in an influencer database 217.

In an embodiment, content creators can search based on various search criteria. For example, a brand owner 106 can search for influencers 104 who have followers that match a target audience for a marketing campaign proposed by the brand owner 106. In an embodiment, the brand owner 106 can input various search criteria (i.e., target audience demographics, time period, frequency of publishing, campaign budget, geographic location, and the like) for content it wishes to publish, and the matching engine 218 searches the data stores 203 and/or the influencer database 217 based on the search criteria. The matching engine 218 then generates a short-list of influencers which match the search criteria.

In an embodiment, the matching engine 218 searches the data stores 203 and/or the influencer database 217, as well as the social media networks 108 (via APIs), to identify followers who match the search criteria.

In an embodiment, the search criteria can also include a specific topic, area of interest, event, and the like. For example, the brand owner 106 can input as search criteria interests such as horseback riding, parasailing, football, etc., topics such as fashion, animals, home improvement, Italian cuisine, etc., or events such the Milan Fashion Week, the Kentucky Derby, Formula One, etc., in order to reach a target audience of followers having those interests.

In yet another embodiment, the matching engine 218 can generate a geographic priority list for the content scheduling engine 200. For example, the matching engine 218 can analyze engagement metrics of influencers 104, brand owners 106, and their respective followers, by a geographic area, such as by, for example, a town, city, region, state, country, continent, etc., and can generate a priority list based on this analysis.

In an embodiment, the target audience can be selected from a list of the content creator's followers, such as the follower list of an influencer 104 or the follower list of a brand owner 106.

The short-list of influencers can be ordered by score or ranking by how closely each identified influencer matches the search criteria input by the brand owner 106. In an embodiment, the score or ranking can be based on how relevant each identified influencer is to the input criteria, using, for example, a relevance algorithm, ranking algorithm, and the like.

In an embodiment, the matching engine 218 can analyze previous content publishing analytics and previous paid marketing campaigns conducted by the identified influencers, and can further rank the identified influencers based on past performance (i.e., success or completion rate, positive or negative reviews or feedback by brand owners that hired the influencer, and the like).

In an embodiment, the matching engine 218 analyzes not only an influencer's followers ("First Level Followers"), but also conducts an extended analysis of the First Level Followers' followers ("Second Level Followers"). Thus, the matching engine 218 can analyze the demographics, reach, and engagement of the First Level Followers, which constitute a near following, and Second Level Followers, which constitute an extended following, and can provide insight into a far reaching audience scope versus that based solely on an influencer's near following. In an embodiment, content creators can select to view additional tiers of followers, such as the Second Level Followers' followers ("Third Level Followers"), the Third Level Followers' followers ("Fourth Level Followers"), and so on. Content creators can thus obtain insights into a far reaching extended following of an influencer 104.

In another embodiment, brand owners 106 can upload content, such as a proposed marketing campaign, to the matching engine 218. The uploaded content can be stored in, for example, content database 219. The matching engine 218 can utilize image, video, and text analysis and processing, audio analysis and processing, and/or artificial intelligence techniques, as described herein, to identify the subject matter, occurrences, persons, and the like, in the content. The matching engine 218 can analyze previously published content by influencers 104 and determine if any previously published content matches the content. The matching engine 218 can then generate a short-list of influencers who may have previously created content similar to the content in the brand owner's proposed marketing campaign. For example, if a brand owner 106 uploads content related to the soft drink Pepsi®, the matching engine 218 can identify the brand and product related to "Pepsi", and can analyze influencer data to determine which influencers have previously published content tagged or related to the brand "Pepsi", to soft drinks in general, to products that compete with Pepsi® (i.e., Coca-Cola®, Sprite®, etc.), to products or subject matter that are complementary to Pepsi® (i.e., tailgating, summertime, chips, sports, etc.), and the like. The matching engine 218 can further analyze the influencer's followers (First Level, Second Level, etc.) to determine if the engagement metrics associated with the brand "Pepsi", or the influencer's previously published content, across the influencer's near and extended following.

The matching engine 218 can not only provide a short-list of influencers who match the proposed marketing campaign content, but can also provide the actual previously published content of these identified influencers 104 so that the brand owner 106 can review.

In an embodiment, the matching engine 218 can utilize various matching techniques, including, but not limited to, fuzzy matching, exact matching, multivariate matching, nearest neighbor matching, optimal pair matching, optimal full matching, genetic matching, coarsened exact matching, subclassification matching, and the like.

In an embodiment, the social media management platform 102 includes a reporting engine 220. The reporting engine 220 can generate periodic reports based on selected metrics and criteria on a pre-determined schedule, such as hourly, daily, bi-weekly, weekly, monthly, quarterly, semi-annually, and annually. Furthermore, content creators can specify a custom schedule for report generation, such as, for example, every Monday at 1pm EST, or every Wednesday at midnight EST, etc.

In an embodiment, such reports may be rendered and displayed to the content creators on their computing devices, the reports can be emailed to the content creator and other recipients designated by the content creator, and/or the reports can be shared or pushed to third-party collaboration and storage applications, such as Slack®, Microsoft Teams®, Dropbox®, Box®, Google Drive®, and the like.

In an embodiment, the social media management platform 102 includes a collaboration engine 222. The collaboration engine 222 facilitates a collaboration between influencers 104 and brand owners 106. In an embodiment, once a brand owner 106 selects at least one influencer 104 from a short-list of influencers, as described herein, the collaboration engine 222 provides a secure environment for the brand owner 106 and influencer 104 to exchange information, record the terms of the collaboration, and facilitate payments between the parties.

In an embodiment, the collaboration engine 222 provides a communication engine 224 that allows the parties to exchange information related to a proposed marketing campaign, such as target audience demographics, campaign duration, pricing, pre-defined content (i.e., such as images, videos, audio, etc.), copy or scripts, templates, follower lists, proposed collaboration terms, and the like. In an embodiment, the communication engine 224 allows for bi-directional communication between the parties, such that the influencer 104 can share previously created content, draft content, marketing plans, existing engagement metrics, forecasted engagement metrics, and other proprietary and/or confidential materials (collectively, "Influencer Materials") with the brand owner 106. Similarly, the brand owner 106 can share existing content, copy, templates, follower lists, campaign requirements, and other proprietary and/or confidential materials (collectively, "Brand Owner Materials") with the influencer 104.

In an embodiment, the collaboration engine 222 allows the brand owner 106, influencer 104, or both parties, to select specific followers or follower lists to which content should be published. For example, the brand owner 106 can provide a list of its followers on a specific social media network, and the influencer 104 can select a sub-set of followers from this list to target for a proposed marketing campaign. Similarly, the influencer 104 can provide a follower list to the brand owner 106, and the brand owner 106 can select a sub-set of followers from this list to target for a proposed marketing campaign.

In another embodiment, a content creator can provide a list of followers to the collaboration engine 222, and this list can be analyzed by the matching engine 218 to identify followers which match a target audience for a proposed marketing campaign.

In an embodiment, the influencer 104 can selectively grant access, deny access, or provide time-limited access to, any Influencer Materials to the brand owner 106 via the communication engine 224. Conversely, the brand owner 106 can selectively grant access, deny access, or provide time-limited access to, any Brand Owner Materials to the influencer 104 via the communication engine 224.

In an embodiment, the collaboration engine 222 can generate custom legal forms for execution by the parties, such as non-disclosure agreements, engagement agreements, intellectual property agreements, and the like.

In an embodiment, the communication engine 224 can provide a chat and/or text messaging functionality, audio calling, video calling, a file storage and sharing functionality, a collaborative content review and editing functionality, and alerting and notification functionality (i.e., push notifications, text messages, and the like upon receipt of messages, status changes of queued content, publishing of content, engagement with published content, completion of a milestone, payment transmittal or receipt, etc.).

In an embodiment, the communication engine 224 provides end-to-end encryption of all communication between the parties. In another embodiment, all information, materials, legal forms and agreements, and data exchanged between the parties can be secured by a distributed ledger 221, wherein for each collaboration, a smart contract can be generated and serves as a permanent record of the terms of the collaboration. In an embodiment, the terms of the collaboration can include, for example, payment terms or schedules, scope, deliverables, milestones, and the like. In addition, the parties can track completed or missed milestones, change requests, payments, and the like via the smart contract.

In an embodiment, the collaboration engine 222 provides a payment engine 226, which facilitates all aspects of payments related to the collaboration between the influencer 104 and the brand owner 106. For example, the payment engine 226 can be a native payment processor operated by the social media management platform 102, or alternatively, can be a third-party payment processor such as PayPal®, Stripe®, Square®, WePay®, Authorize.net®, and the like.

In an embodiment, upon the parties agreeing to the terms of a collaboration, the influencer 104 can send an invoice via the payment engine 226 to the brand owner 106. The brand owner 106 can make either a full upfront payment of the invoice or a partial payment, such as an installment. The payment can be escrowed by the payment engine 226 until such time that both parties agree that the payment can be released to the influencer 104. Where the parties agree on an installment schedule, each installment or partial payment can be escrowed, and the escrow can be released to the influencer 104 when the full invoice balance has been reached. In another embodiment, a third-party escrow service can be utilized by the parties.

In an embodiment, the terms of the collaboration may indicate milestone payments, instead of an upfront full payment by the brand owner 106. In this scenario, upon meeting an agreed-upon milestone which is recorded in the smart contract, the influencer 104 can notify the payment engine 226, and the payment engine 226 can send an invoice for that particular milestone to the brand owner 106. In an embodiment, all milestones and milestone payment amounts can be retrieved from the smart contract by the payment engine 226. In an embodiment, each milestone payment can be escrowed, and subsequently released to the influencer 104 upon the next agreed-upon milestone being met.

In yet another embodiment, upon the parties agreeing to the terms of a collaboration, the influencer 104 can send an invoice via the payment engine 226 to the brand owner 106. The brand owner 106 is required, by the payment engine 226, to make a full payment of the invoice. Depending on the payment terms agreed upon by the parties, the payment engine 226 can then release the full payment to the influencer 104, or alternatively, can release installment and/or milestone payments to the influencer 104. By requiring the brand owner 106 to deposit the full invoiced amount for escrow with the payment engine 226, the social media management platform 102 provides peace of mind to the influencer 104, and ensures integrity of the collaboration between the parties.

In an embodiment, in the event of a dispute resulting from the collaboration, the social media management platform 102 can act as an arbiter between the parties, can assist the parties to come to a resolution regarding payment, quality of the delivered content, and the like. In this embodiment, the parties can agree to resolve all disputes regarding the collaboration via a dispute resolution clause or agreement generated by the collaboration engine 222.

In yet another embodiment, the payment engine 226 can generate digital wallets for the parties. In this embodiment, the influencer 104 and brand owner 106 can create a digital wallet that is linked to a fiat financial account, such as a bank account, or which is linked to an external digital currency wallet, such as those offered by Coinbase®, Gemini®, and the like. The parties can then transfer fiat or digital currency funds to their digital wallet, which can either remain as in their original form (i.e., fiat or digital currency), or can be converted to another form (i.e., fiat to digital currency and vice versa) by the payment engine 226. In an embodiment, the social media management platform 102 includes a closed, proprietary digital currency which can be utilized to conduct transactions between influencers 104 and brand owners 106, and which is linked to the smart contracts. In yet another embodiment, the digital currency can be an open digital currency such as Bitcoin, Ethereum, and the like which can be traded and exchanged within, as well as outside of, the social media management platform 102.

In an embodiment, the social media management platform 102 includes a tracking engine 228. The tracking engine 228 can aggregate, analyze, and report information related to influencers 104, such as engagement activity across multiple social media networks 108. As described herein, the tracking engine 228 can pull or request such information via APIs with each social media network 108.

In an embodiment, the tracking engine 228 allows brand owners 106, as well as influencers 104, to compare an influencer's engagement activity relative to another influencer, or relative to a group of influencers. The tracking engine 228 allows such comparison to be done based on various criteria, similar to the criteria available via the dashboard engine 216 as described herein. In addition, the tracking engine 228 allows such comparison to be done based on the criteria including, but not limited to, a selected region (i.e., a custom selected region or regions, town, city, region, state, country, continent, and/or globally), language (i.e., target audience language, influencer language, and/or brand owner language), industry, and social media network.

In an embodiment, the social media management platform 102 includes a security engine 230. The security engine 230 performs encryption on all data residing on the data stores 203, as well as all data communicated and processed by the engines 201. In an embodiment, the security engine 230 utilizes an Advanced Encryption Standard (AES), such as AES 256, AES 192, AES 128, and the like. In an embodiment, encryption can be utilized along with distributed ledger technology so that the data residing on the data stores 203 is decentralized, making it inherently difficult to alter, hack, or otherwise manipulate.

In an embodiment, the content creators can selectively encrypt their data, and can grant access to such data with third-parties, as well as other brand owners 106 and/or influencers 104. In this embodiment, third-parties wishing to access particular data must request access from the content creator.

Furthermore, content creators have autonomy to decide how their data will be shared, monetized, and accessed. In an embodiment, content creators can selectively share data to third-party advertisers, brand owners 106, and other influencers 104. In an embodiment, content creators can auction or put selected data up for bidding or sale via the collaboration engine 222.

In an embodiment, the social media management platform 102 includes a thumbnail generation engine 232. Online video platforms and social media networks that offer video streaming typically generate thumbnail images representative of the video content in each of a number of different videos. These thumbnail images are intended to be representative of the underlying video content, and must be visually exciting and stimulating in order to entice users to select videos for viewing. In addition, thumbnails facilitate browsing and searching of the videos. However, conventional automated thumbnail generation processes do not always guarantee that the thumbnail images generated represent a video will be either visually stimulating or particularly representative of the underlying video content. For example, existing online video platforms and social media network merely generate thumbnails from random portions of the video, such as at the 25%, 50%, and 75% mark in the video. A choice is then made from one of the three random thumbnails. This rigid and non-intelligent method for selecting the thumbnails cannot guarantee that any of the proposed thumbnails will be visually pleasing or an accurate representation of the content. Moreover, it can be costly and time-consuming for content creators to manually create and, if needed, modify thumbnail images.

The thumbnail generation engine 232 addresses the shortcomings of conventional methods to generate thumbnails for video content. In an embodiment, the thumbnail generation engine can utilize image and video analysis and processing, audio analysis and processing, and/or artificial intelligence techniques to identify candidate frames which are aesthetically pleasing from video content which can be used for a thumbnail. The thumbnail generation engine 232 can identify multiple candidate frames and present the candidate frames for selection by the content creator.

In an embodiment, to determine whether a frame is aesthetically pleasing, the thumbnail generation engine 232 can consider, for each analyzed frame in the video content, the color (i.e., hue, saturation, and lightness), quality, temporal location of the frame (i.e., near the beginning, middle, end, etc.), the number of detected occurrences in the frame, as described herein, text contained in the frame, and the like.

In an embodiment, the generated thumbnails are stored in thumbnail database 221.

In an embodiment, the social media management platform 102 includes a membership engine 234 that offers content creators at least three distinct levels of membership:

(1) First Level: Content creators can access a limited number of engines, such as the content scheduling engine 200, content queue management engine 202, content editing engine 204, and the communication engine 224, that enables them to edit, schedule, and upload content to various social media networks 108, for example.

(2) Second Level: Content creators can access additional engines, including those of the First Level of membership, plus, advanced image and video functionality, audio engine 208, tag generation engine 212, the facial recognition engine 214, and the matching engine 218, for example.

(3) Third Level: Content creators can access additional engines, including those of the First and Second Levels of membership, plus, for example, the video summary engine 206, the tracking engine 228, and the thumbnail generation engine 232.

In an embodiment, the engines accessible for each level of membership can be adjusted or modified by an administrator of the social media management platform 102. In addition, content creators who subscribe to, or purchase, for example, a First Level membership, can purchase one-time or limited-time access to more additional engines which would only be available in Second and Third Levels of membership.

In an embodiment, the social media management platform 102 includes a gamification engine 236. The gamification engine 236 can operate in conjunction with the membership engine 234, and allow content creators to access or unlock higher levels of membership through earning points by using the social media management platform 102. In an embodiment, influencers 104 can earn points each time they publish content on a social media network 108. The number of points earned can be based on the specific activity (i.e., publishing content, editing content, responding to a proposal from a brand owner 106, and the like). In an embodiment, the points can be stored in a points wallet, or alternatively, the points can be converted to a digital currency, such as a closed, proprietary digital currency as described herein. In this embodiment, the points are converted to the digital currency and subsequently stored in a digital wallet.

Upon accumulating a threshold number of points, the content creator can unlock a higher tier of membership. For example, if a content creator has a First Level membership, and obtains a certain number of points within a specified period of time (i.e., one month, one quarter, one year, etc.), then the Second Level membership is unlocked for the content creator.

In an embodiment, if a content creator does not maintain or earn a threshold number of points for a specified period of time, then the membership level for the content creator can be downgraded. For example, if a content creator has a Second Level membership, and does not earn a certain number of points within a specified period of time, then their membership can be moved down to a First Level membership.

Figure 3:
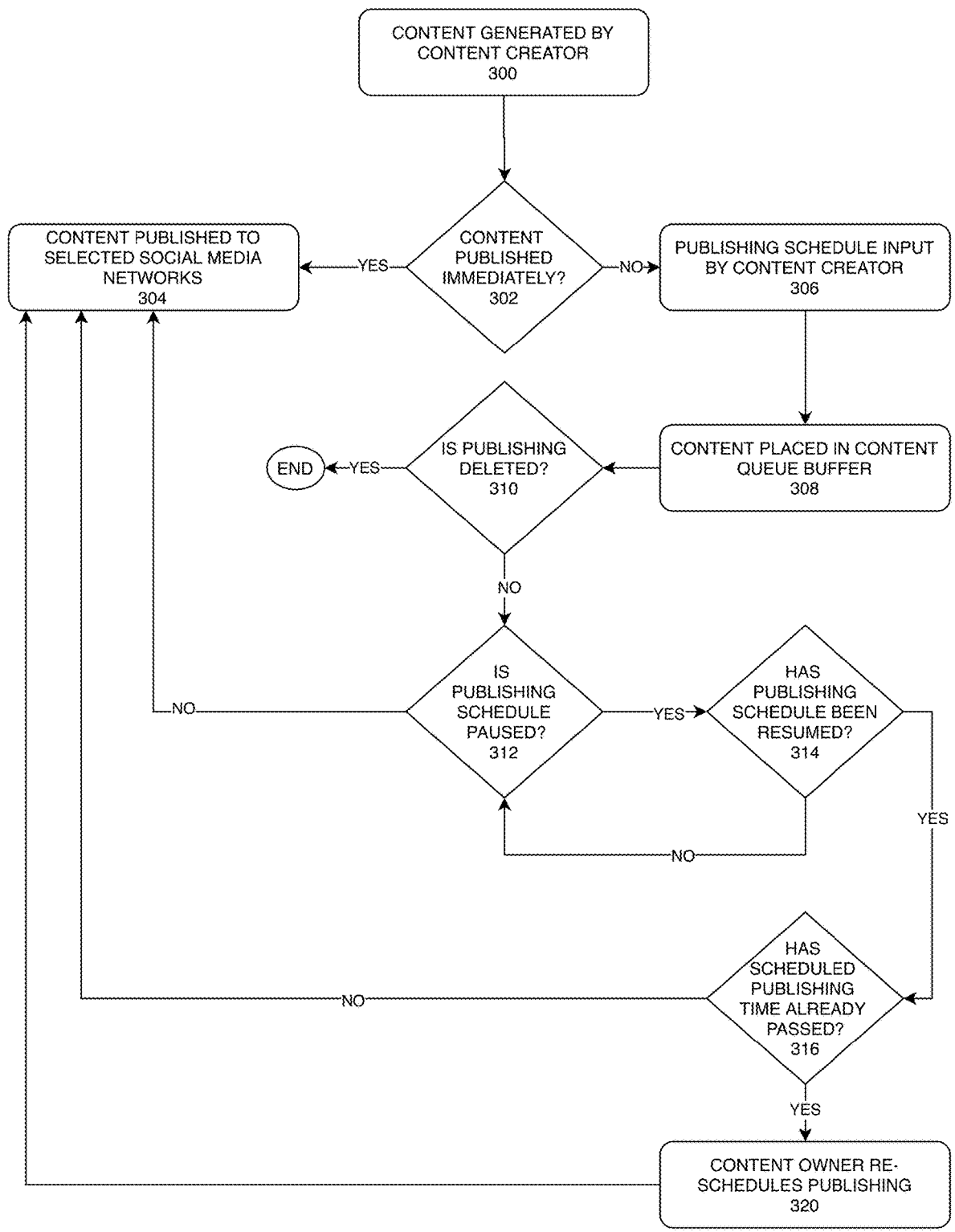
FIG. 3 is a flowchart depicting the steps for queueing and publishing content, according to an embodiment of the present invention.

FIG. 3 is a flowchart depicting the steps for queueing and publishing content, according to an embodiment of the present invention. At step 300, content is generated by the content creator, as described herein. At step 302, the content creator selects whether the content is to be published immediately, or if the content is to be scheduled for publishing at a later time. If the content is scheduled for immediate publishing, then at step 304, the content is published to at least one social media network 108 as described herein.

However, if the content creator selects to publish the content at a later time, then at step 306, the content creator inputs a publishing schedule for the content. At step 308, the content queue management engine 202 places the content into the content queue buffer 308, along with the publishing schedule. While the content is in the content queue buffer 308, the content queue management engine 202 allows queued content to be paused, deleted, and resumed (if previously paused), and it also allows the publishing schedule for the queued content to be modified.

At step 310, the content queue management engine 202 determines if the queued content has been deleted from the content queue buffer 308 by the content creator. If the queued content has been deleted by the content creator, then the process ends. If, however, the queued content has not been deleted by the content creator, then at step 312, the content queue management engine 202 determines if the publishing schedule for the queued content is paused by the content creator. If the queued content is paused by the content creator, then the process continues to step 304, where the content is published to at least one social media network 108 as described herein.

However, if the publishing schedule for the queued content is paused by the content creator, then at step 314 the content queue management engine 202 determines if the publishing schedule has been resumed by the content creator. If the publishing schedule has not been resumed, the process returns back to step 312, where the content queue management engine 202 determines if the publishing schedule for the queued content is still paused.

However, if the publishing schedule has been resumed by the content creator at step 314, then at step 316, the content queue management engine 202 determines if the scheduled publishing time has already passed. If the scheduled publishing time has not already passed, then the process continues to step 304, where the content is published to at least one social media network 108 at the scheduled publishing time.

In an embodiment, if the publishing schedule has been resumed by the content creator at step 314, and if the scheduled publishing time has not already passed at step 316, then the content queue management engine 202 provides the following options to the content creator: (1) publish the queued content as originally scheduled, (2) select another publishing time, as well as other criteria or parameters, (3) immediately publish the queued content, or (4) delete the queued content from the content queue buffer 205. The process then continues to step 304, where the content is published to at least one social media network 108 based on the selection by the content creator.

However, if the scheduled publishing time has passed while the queued content was paused, then at step 320, the content queue management engine 202 provides the following options to the content creator: (1) select another publishing time, as well as other criteria or parameters, (2) immediately publish the queued content, or (3) delete the queued content form the content queue buffer 205. The process then continues to step 304, where the content is published to at least one social media network 108 based on the selection by the content creator.

Figure 10:
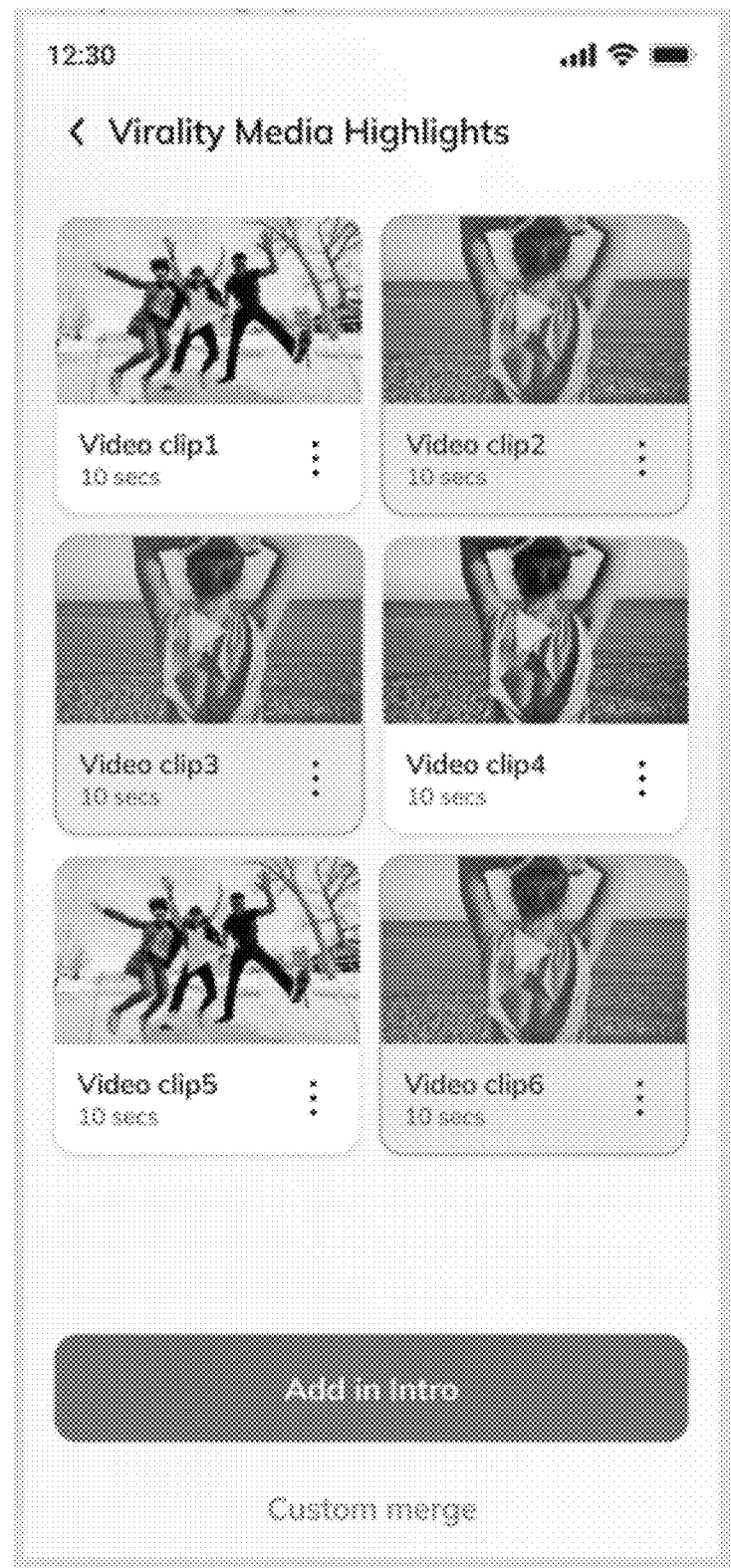
FIG. 10 is an exemplary interface for selecting key frames to generate short-format videos by a video summary engine, according to an embodiment of the present invention.
Figure 11:
FIG. 11 is an exemplary interface for editing image and video content via a digital media editing engine, according to an embodiment of the present invention.
Figure 12:
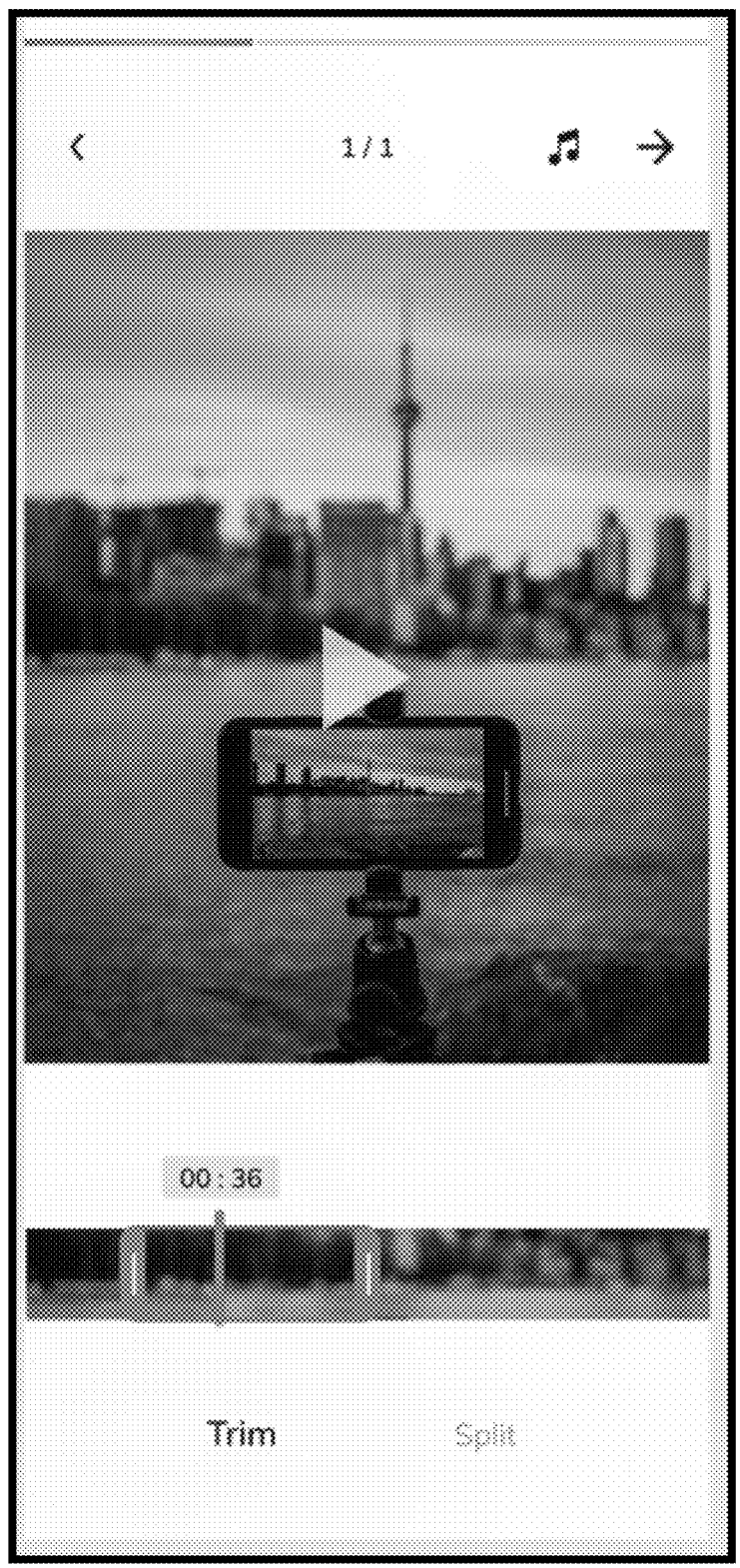
FIG. 12 is an exemplary interface for manually trimming video content via a digital media editing engine, according to an embodiment of the present invention.
Figure 13:
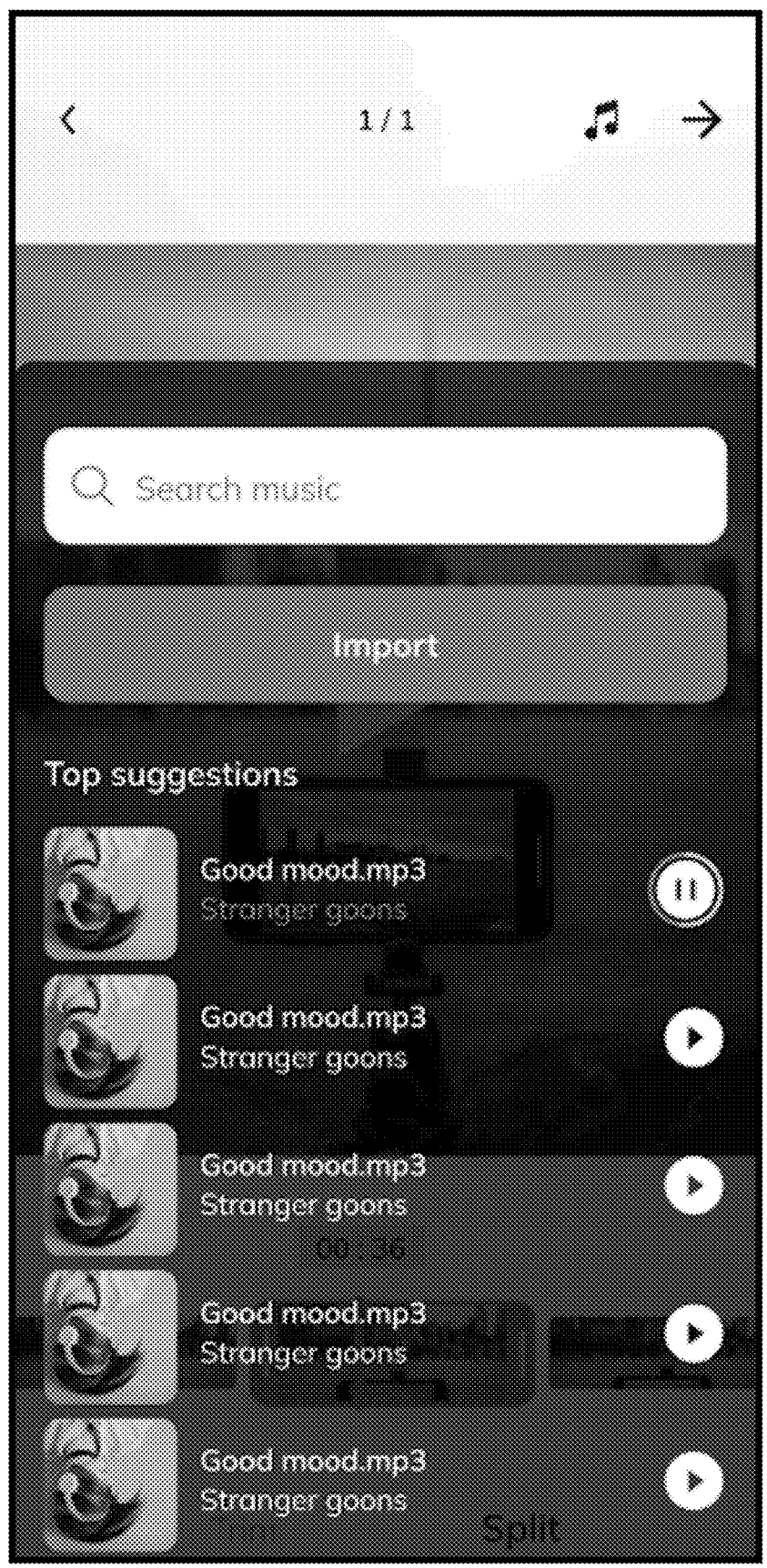
FIG. 13 is an exemplary interface for searching for audio tracks via an audio engine, according to an embodiment of the present invention.
Figure 14:
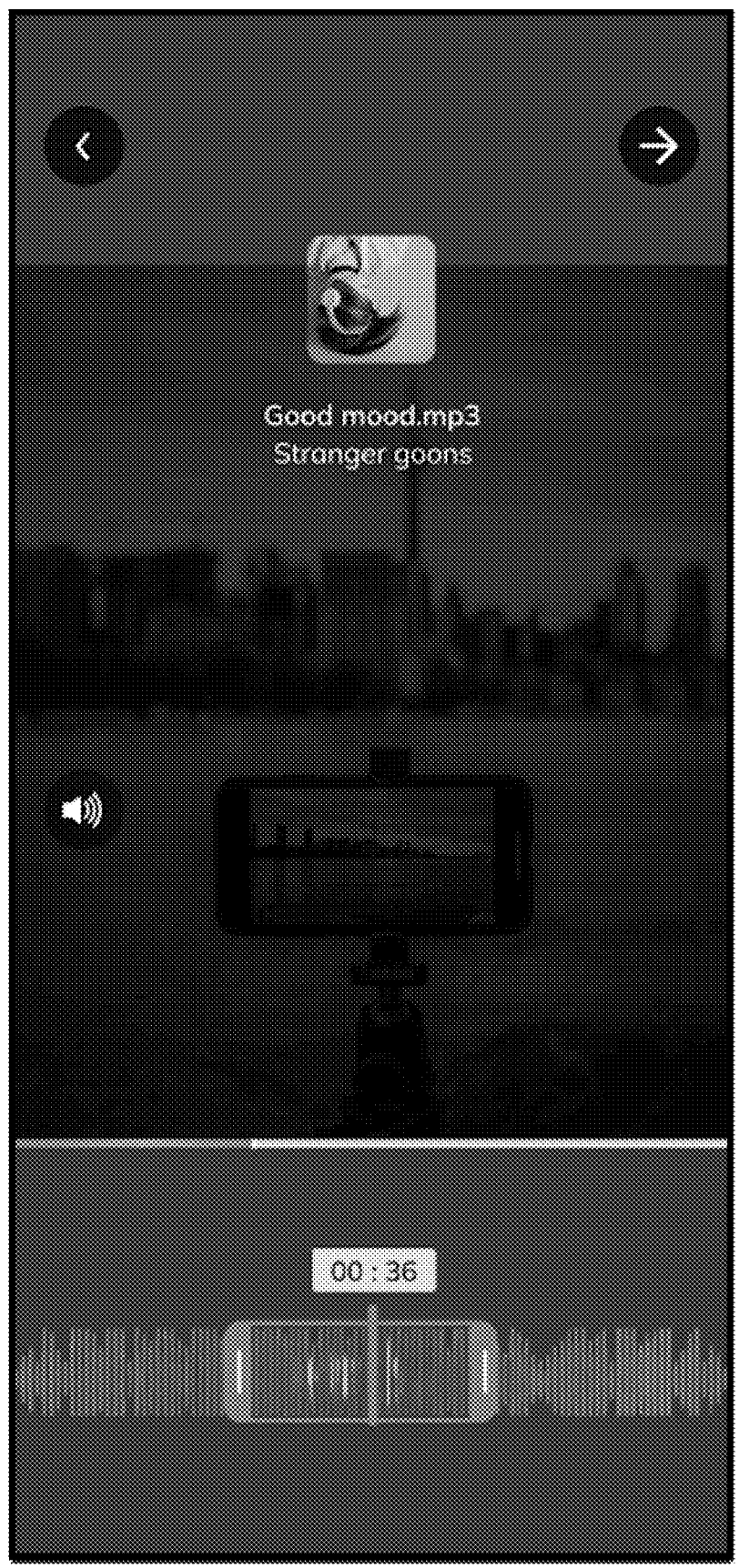
FIG. 14 is an exemplary interface for positioning an audio track within video content via the audio engine, according to an embodiment of the present invention.
Figure 15:
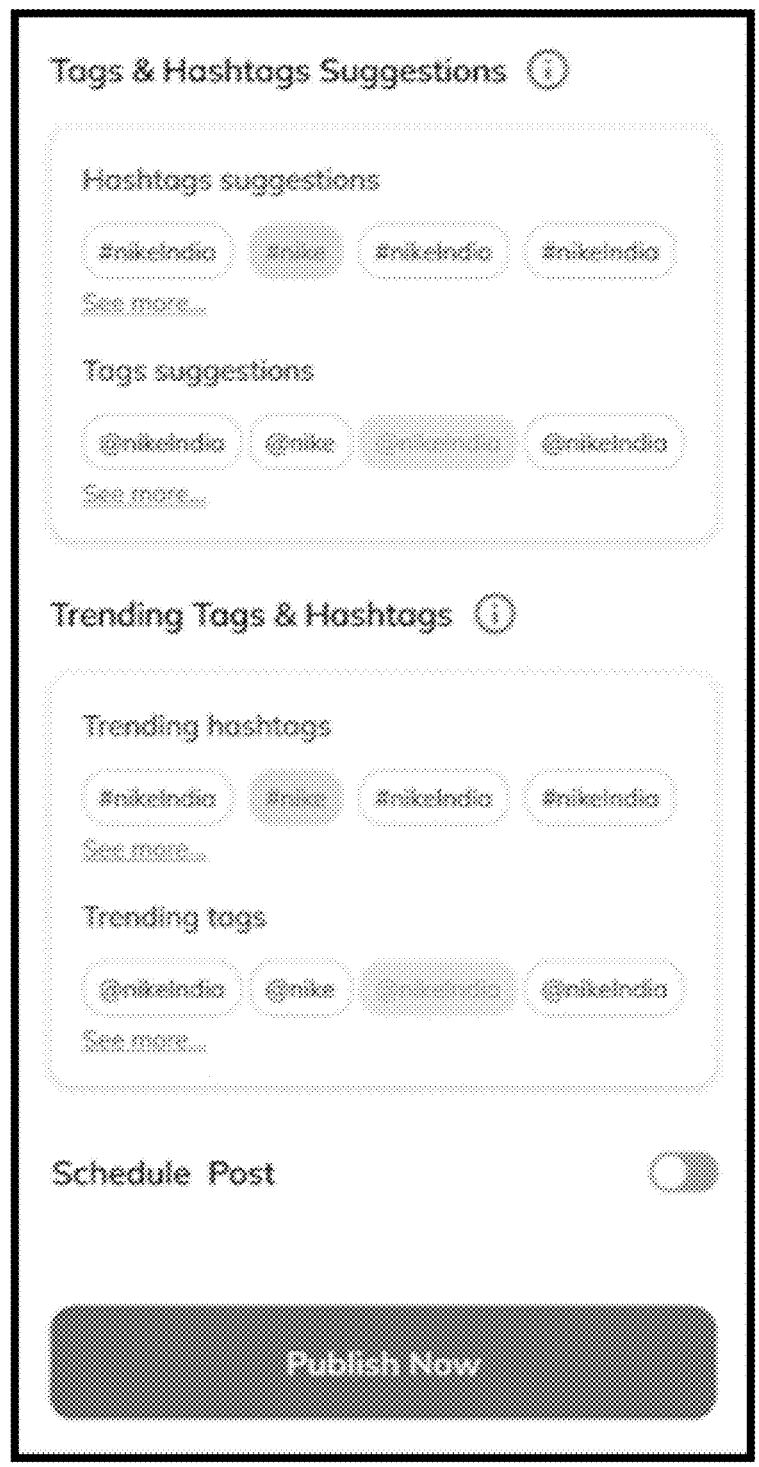
FIG. 15 is an exemplary interface for displaying suggested and trending hashtags generated by a tag generation engine, according to an embodiment of the present invention.
Figure 16:
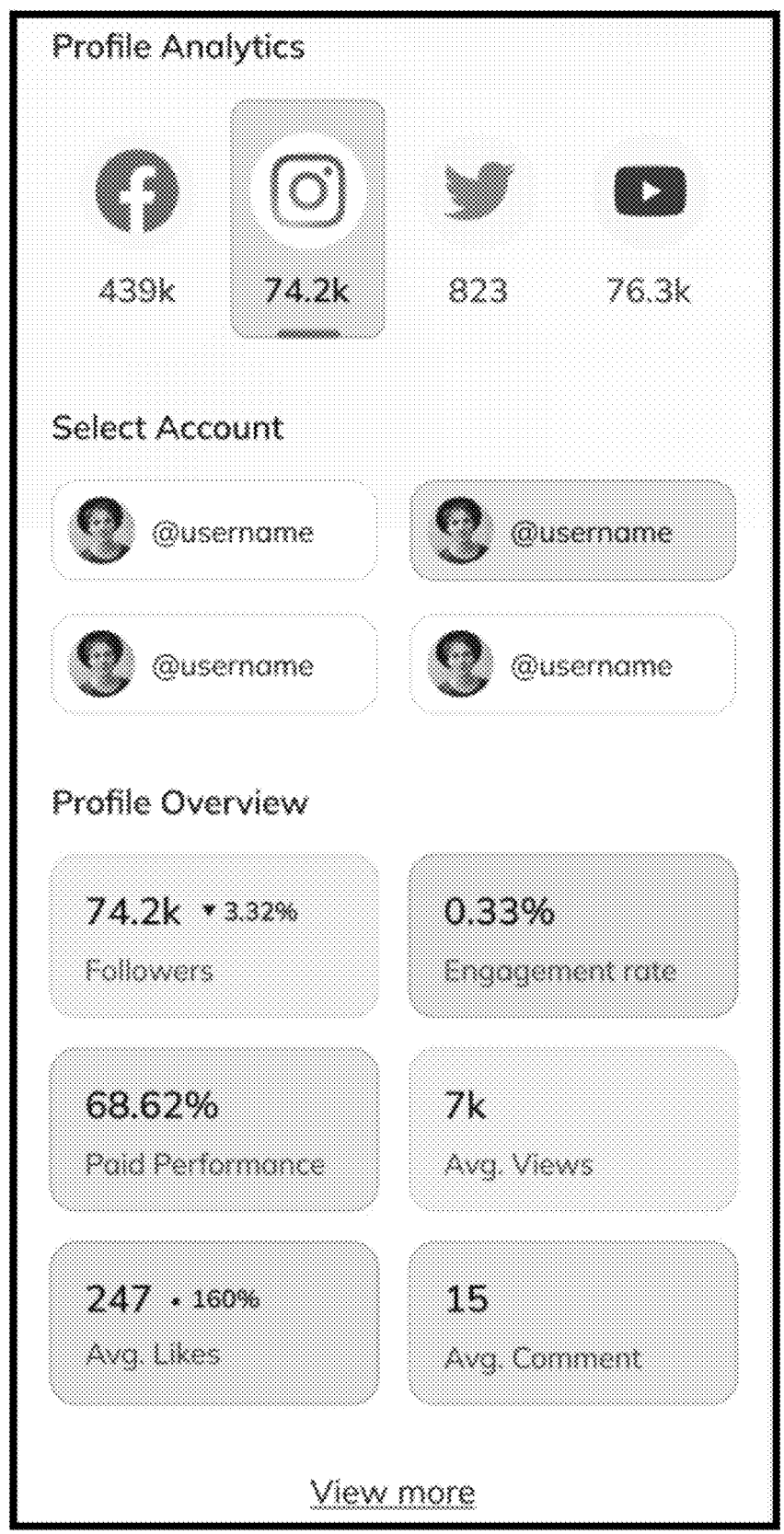
FIG. 16 is an exemplary interface for a dashboard for content creators generated by a dashboard engine, according to an embodiment of the present invention.
Figure 17:
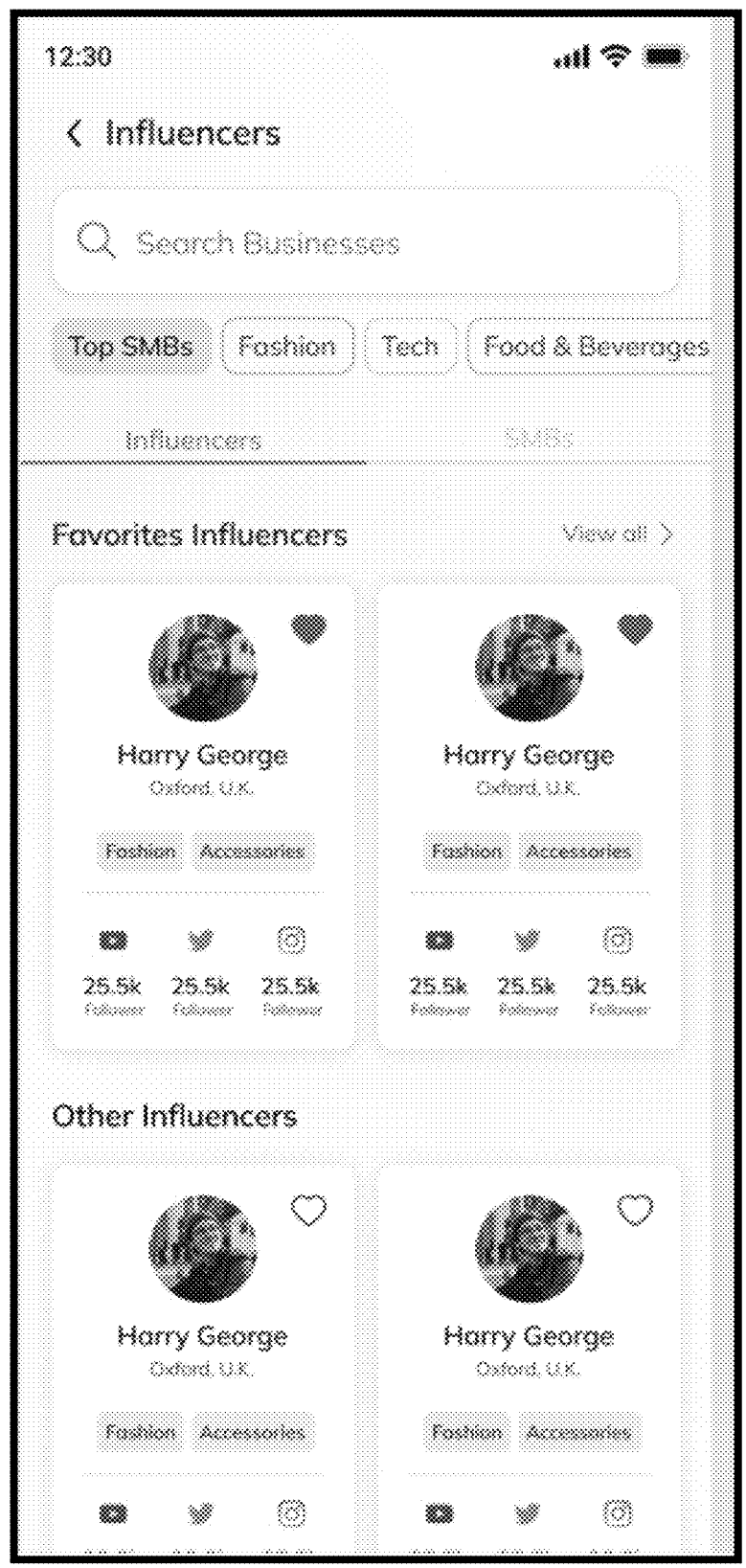
FIG. 17 is an exemplary interface for searching for influencers via a collaboration engine, according to an embodiment of the present invention.
Figure 18:
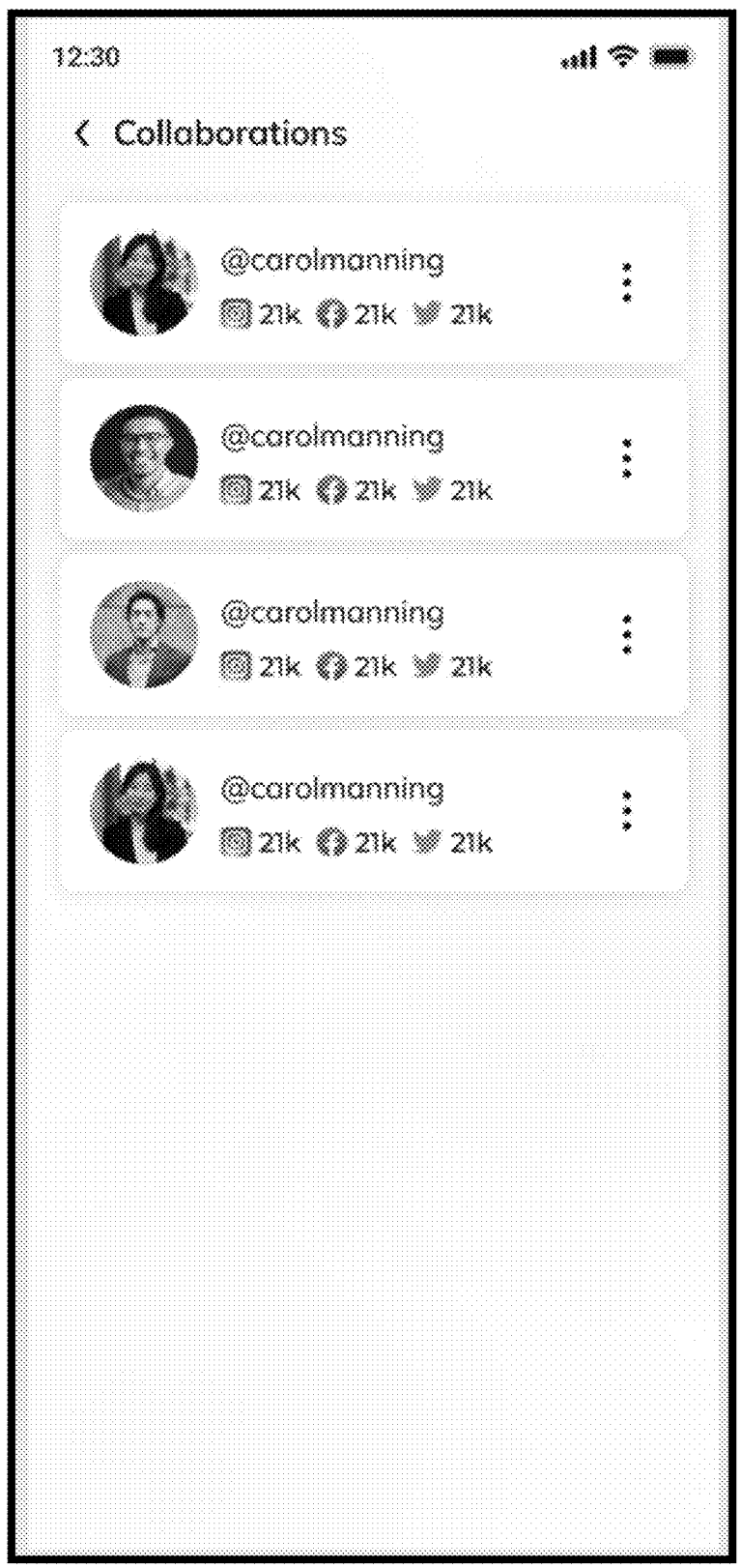
FIG. 18 is an exemplary interface for viewing collaborations via the collaboration engine, according to an embodiment of the present invention.
Figure 19:
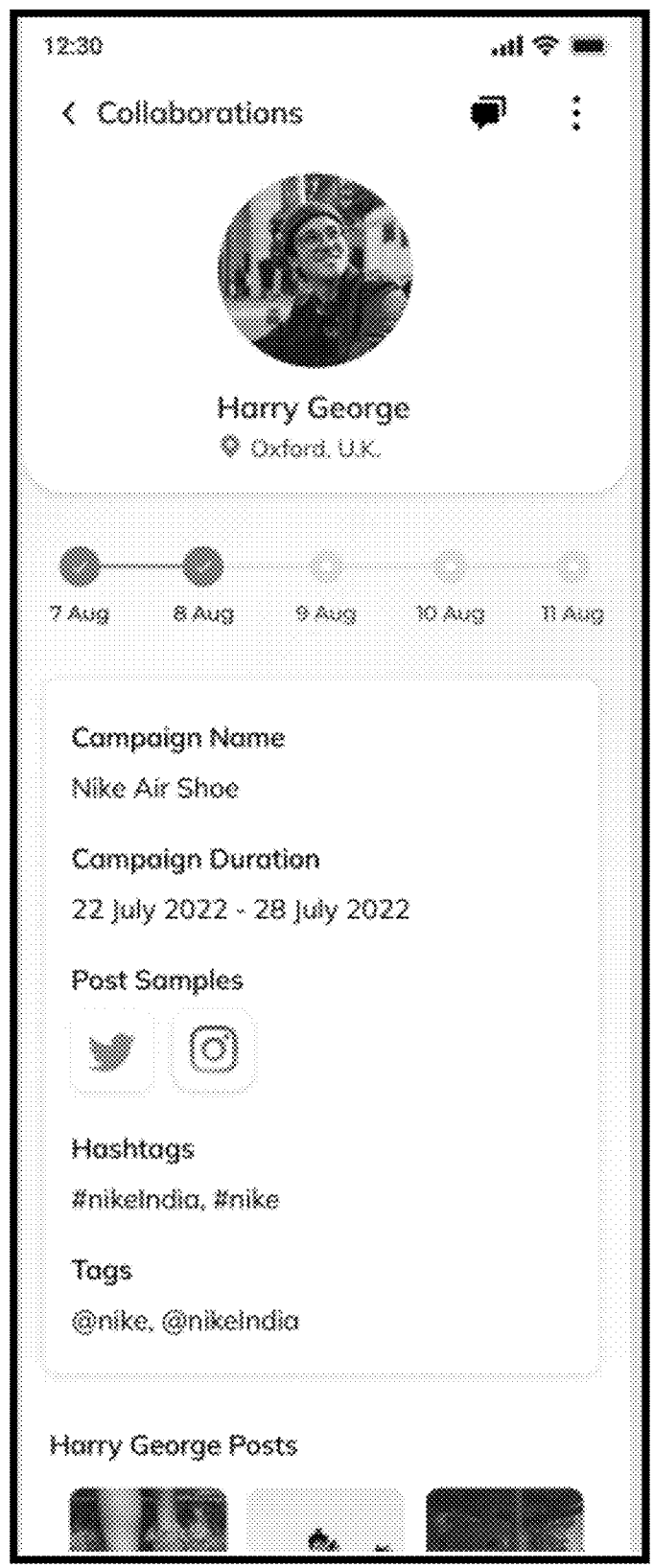
FIG. 19 is an exemplary interface for viewing information for a specific collaboration via the collaboration engine, according to an embodiment of the present invention.
Figure 20:
FIG. 20 is an exemplary interface for communication between content creators via a communication engine, according to an embodiment of the present invention.
Figure 21:
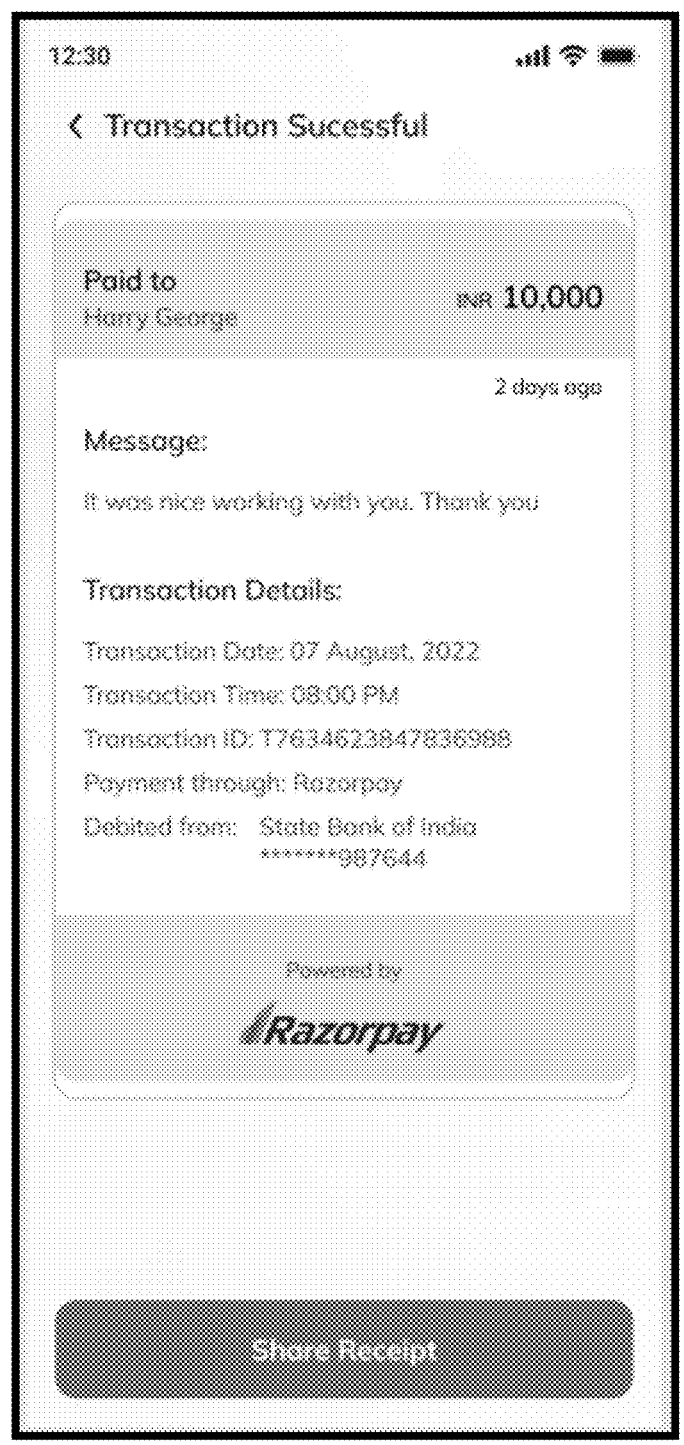
FIG. 21 is an exemplary interface displaying a payment confirmation from a brand owner to an influencer via a payment engine, according to an embodiment of the present invention.
Figure 22:
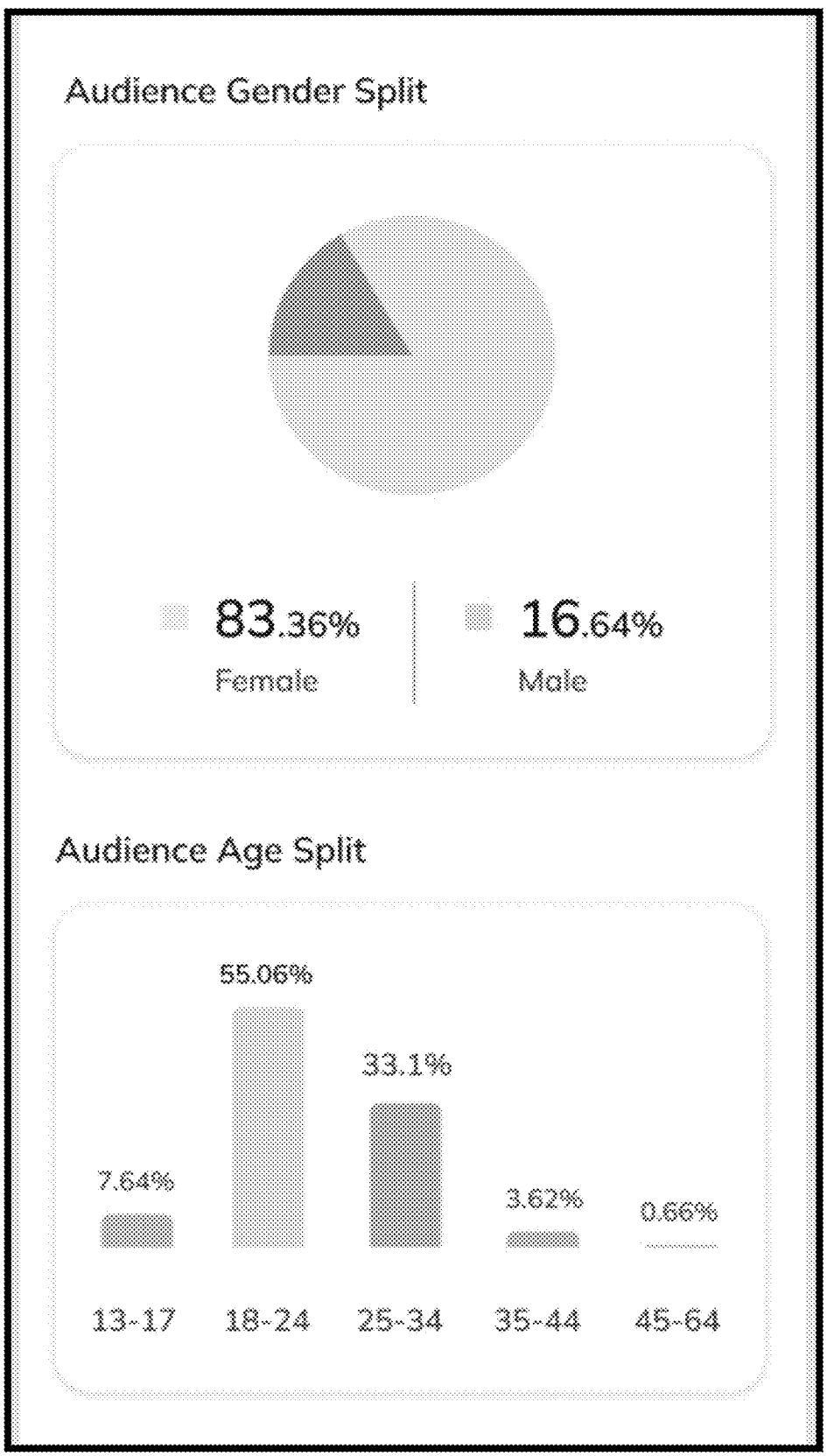
FIG. 22 is an exemplary interface displaying engagement activity generated by a tracking engine, according to an embodiment of the present invention.
Figure 23:
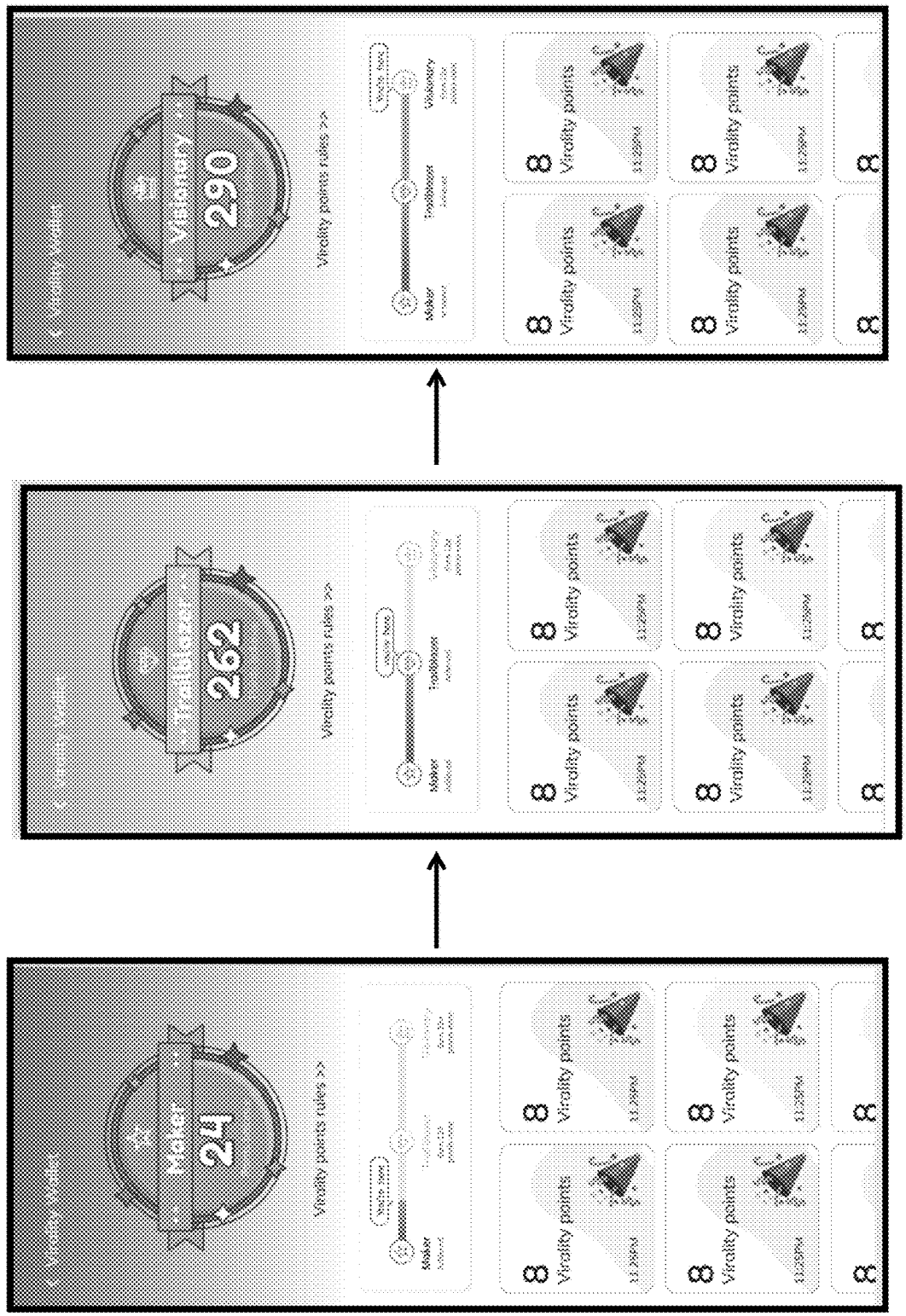
FIG. 23 are exemplary interfaces displaying points wallets for various membership levels, according to an embodiment of the present invention.

In an embodiment, the content queue management engine 202 can display queued content, as well as content that has already published, as shown in FIG. 10.

Figure 4:
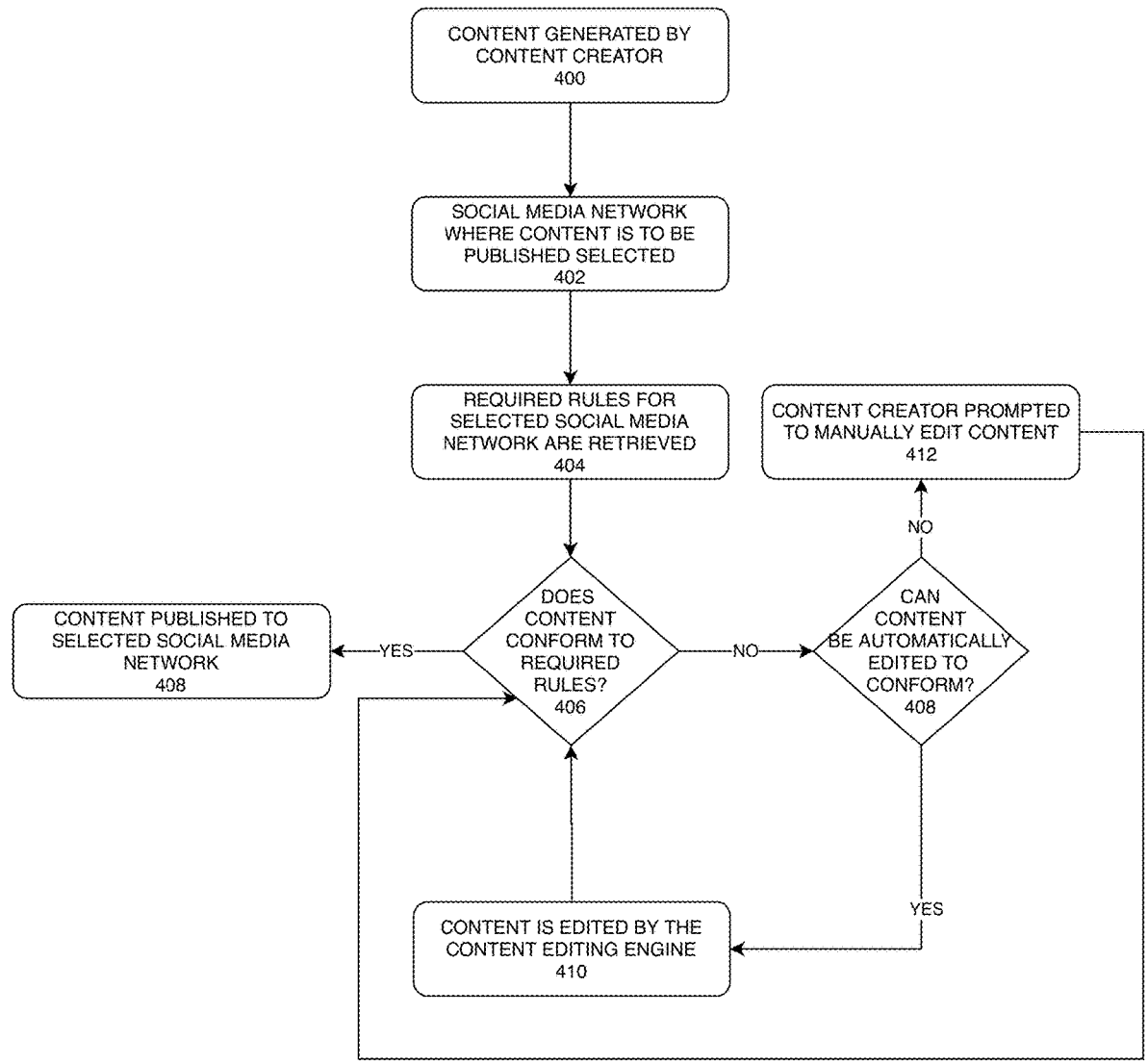
FIG. 4 is a flowchart depicting the steps for editing content, according to an embodiment of the present invention.

FIG. 4 is a flowchart depicting the steps for editing content, according to an embodiment of the present invention. At step 400, content is generated by the content creator, as described herein. At step 402, the content creator selects the social media network(s) 108 where content is to be published. In an embodiment, the content scheduling engine 200 can select the optimal social media network(s) 108 where the content should be published, as described herein. In yet another embodiment, the content scheduling engine 200 can suggest social media network(s) where the content should be published, and the content creator can select social media network(s) from the suggested list.

At step 404, the required rules file for the social media networks 108 selected at step 402 is/are retrieved from the rules database 207 by the content editing engine 204. In an embodiment, a separate required rules file for each selected social media network 108 is retrieved from the content editing engine 204. At step 406, the content editing engine 406 analyzes the content and compares the content to the required rules. If the content conforms to the required rules, then the content is published to respective the social media network 108 at step 408. Step 406 is repeated for each social media network 108 that is selected at step 402.

However, if the content does not conform to the required rules at step 406, then at step 408, the content editing engine 204 determines if the content can be automatically edited by the content editing engine 204 to conform to the required rules. If the content editing engine 204 can automatically edit the content, then at step 410, the content is edited as described herein. In an embodiment, such automatic editing can include, for example, adjusting the size, length, quality, frame rate, pixel count, colors, and the like. The process then returns back to step 406, where the content editing engine 204 determines again if the edited content conforms to the required rules.

However, if the content editing engine 204 determines at step 408 that the content cannot be automatically edited by the content editing engine 204 to conform to the required rules, then the content creator is prompted to manually edit the content at step 412. In an embodiment, such manual editing can include, for example, adjusting the length of, trimming, and/or cropping video content. The process then returns back to step 406, where the content editing engine 204 determines again if the edited content conforms to the required rules.

Figure 5:
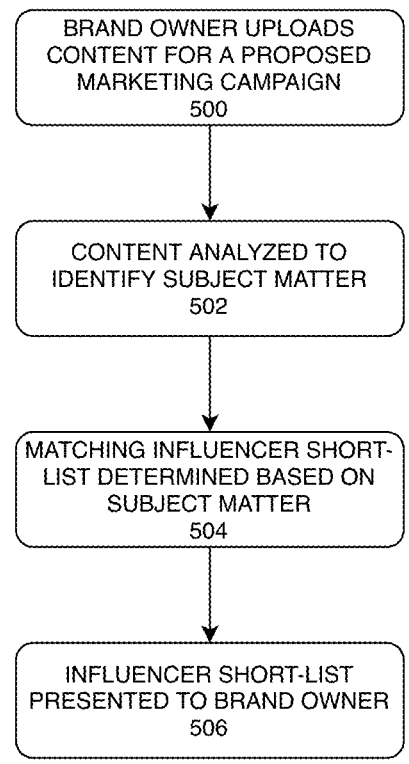
FIG. 5 is a flowchart depicting the steps for automatically matching brand owners and influencers for a collaboration, according to an embodiment of the present invention.

FIG. 5 is a flowchart depicting the steps for automatically matching brand owners and influencers for a collaboration, according to an embodiment of the present invention. At step 500, brand owners 106 can upload content, such as a proposed marketing campaign, videos, images, audio, copy or scripts, and the like, to the matching engine 218. At step 502, the matching engine 218 can utilize image, video, and text analysis and processing, and/or artificial intelligence techniques, as described herein, to identify the subject matter of, or contained in, the content.

At step 504, the matching engine 218 analyzes previously published content by influencers 104, and determines and/or generates a short-list of influencers who may have previously created content similar to the content uploaded by the brand owner 106. At step 506, the short-list of influencers is presented to the brand owner 106, who can then select one or more influencers to communicate with, engage, and/or collaboration with. The process then continues to the process described herein with respect to FIG. 7.

Figure 6:
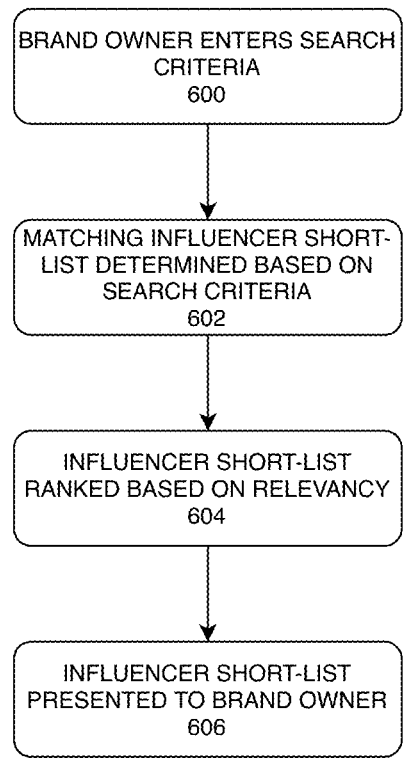
FIG. 6 is a flowchart depicting the steps of searching for matching influencers, according to an embodiment of the present invention.

FIG. 6 is a flowchart depicting the steps of searching for matching influencers, according to an embodiment of the present invention. At step 600, brand owners 600 can enter various search criteria to identify influencers 104 which may be suitable candidates to collaborate with for a proposed marketing campaign. The search criteria can include, for example, target audience demographics, time period, frequency of publishing, campaign budget, geographic location, and the like. At step 602, the matching engine 218 searches the influencer database 217 and/or the data stores 203 based on the search criteria and generates a short-list of influencers which match the search criteria. At step 604, the matching engine 218 orders the short-list of influencers based on how closely each identified influencer matches the search criteria, as described herein. Next, at step 606, the matching engine 218 presents the ordered short-list of influencers to the brand owner 106, who can then select one or more influencers to communicate with, engage, and/or collaborate with. The process then continues to the process described herein with respect to FIG. 7.

Figure 7:
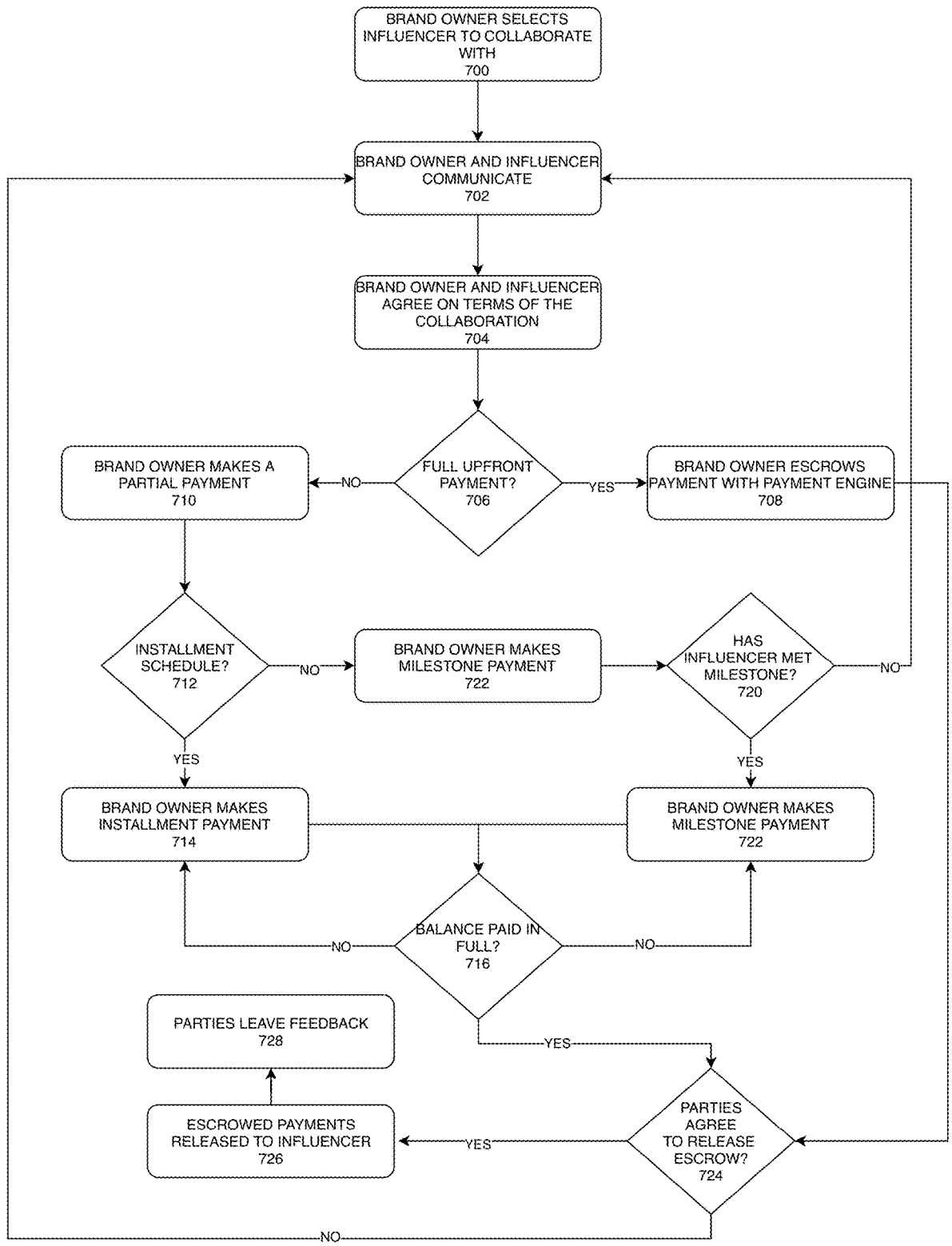
FIG. 7 is flowchart depicting the steps for facilitating collaboration between brand owners and influencers, according to an embodiment of present invention.

FIG. 7 is flowchart depicting the steps for facilitating collaboration between brand owners and influencers, according to an embodiment of present invention. At step 700, the brand owner 106 selects at least one influencer 104 to collaborate with. This selection can be made from a short-list of influencers suggested by the matching engine 218 as described herein with respect to FIGS. 5 and 6. Alternatively, the brand owner 106 can directly reach out to an influencer 104 via the social media management platform 102.

At step 702, the brand owner 106 and influencer 104 communicate via the communication engine 224 to exchange information related to a collaboration, such as, for example, proposed marketing campaign, such as target audience demographics, duration, pricing, pre-defined content (i.e., such as images, videos, audio, etc.), copy or scripts, templates, follower lists, proposed collaboration terms, and the like.

At step 704, the brand owner 106 and influencer 104 agree on the terms of the collaboration, and execute any appropriate legal forms, as describe herein. Such terms can include, for example, a negotiated price, payment terms or schedules, installment payment schedules, scope, deliverables, milestones, milestone payment schedules, and the like. In an embodiment, the terms of the collaboration is recorded on the distributed ledger 221, as described herein.

At step 706, the collaboration engine 222 determines if the terms of the collaboration require a full upfront payment to the influencer 104. If a full upfront payment of the negotiated price is required, then at step 708, the brand owner 106 makes a payment via the payment engine 226, and the payment is escrowed by the payment engine 226. The process then continues to step 724, where if the parties agree to release the escrowed payment to the influencer 104, then at step 726, the escrowed payment is released to the influencer 104, and the collaboration will be deemed to have been completed. In an embodiment, only the brand owner 106 is required to approve the release of escrow at step 724.

However, if at step 724, the parties do not agree to release the escrowed payment to the influencer 104, the process returns to step 702 where the parties communicate with one another regarding the collaboration and issues regarding completion, payment, and release of escrow.

In an optional step 728, the parties can provide public or private feedback about the other, as well as the collaboration. In an embodiment, the feedback can be stored in a feedback database 225. The feedback can include, for example, a star rating, a written review or opinion, a like/dislike, and numerical rating (i.e., out of 1 to 10), and the like. In an embodiment, if the feedback is made public, then the feedback in the feedback database 225 is searchable by the matching engine 218 during queries made by content creators. However, if the feedback is made private, then it is not searchable or otherwise accessible by the matching engine 218 during queries made by content creators.

However, if at step 706, the terms of the collaboration do not require a full upfront payment, then at step 710, the brand owner 106 makes a partial payment of the negotiated price via the payment engine 226. At step 712, the collaboration engine 222 determines if the terms of the collaboration provide for an installment schedule, where the brand owner 106 periodically makes payments to the influencer 104 based on a pre-negotiated or pre-defined schedule.

If the terms of the collaboration provide for an installment schedule, then at step 714, the brand owner 106 makes the installment payment pursuant to the installment schedule via the payment engine 226. At step 716, the payment engine 226 determines if the balance of the negotiated price has been paid in full in escrow by the brand owner 106. If the balance has not been paid in the full, the process then returns to step 714 where the brand owner 106 is prompted to continue making installment payments pursuant to the installment schedule.

However, if at step 712, the collaboration engine 222 determines that the terms of the collaboration do not provide for an installment schedule, then at step 718, the collaboration engine 222 retrieves and/or reviews a milestone payment schedule provided in the terms of the collaboration.

At step 720, the collaboration engine 222 determines if a specific milestone has been met by the influencer 104. In an embodiment, this determination can be made based on if the brand owner 106 has acknowledged completion of, or satisfaction of, a milestone being met. In another embodiment, this determination can be made by the collaboration engine 222 analyzing the content generated pursuant to a particular milestone, using, for example, image, video, and text analysis and processing and/or artificial intelligence techniques as described herein. If the specific milestone has not been met, then the process returns to step 702 where the parties communicate with one another regarding the milestone.

However, if at step 720, the specific milestone has been met, then at step 722, the brand owner 722 makes a milestone payment pursuant to the milestone payment schedule via the payment engine 226. The process continues to step 716, where payment engine 226 determines if the balance of the negotiated price has been paid in full in escrow by the brand owner 106. If the balance has not been paid in the full, the process then returns to step 722 where the brand owner 106 is prompted to continue making milestone payments pursuant to the milestone payment schedule.

However, if at step 716, the payment engine 226 determines that the balance of the negotiated price has been paid in the full, the process then continues to step 724. At step 724, if the parties agree to release the escrowed payment to the influencer 105, then at step 726, the escrowed payment is released to the influencer 104, and the collaboration will be deemed to have been completed. In an embodiment, only the brand owner 106 is required to approve release of the escrowed payment to the influencer 104 at step 724.

However, if at step 724, the parties do not agree to release the escrowed payment to the influencer 104, the process returns to step 702 where the parties communicate with one another regarding the collaboration and issues regarding completion, payment, and release of escrow.

In an optional step 728, the parties can provide public or private feedback about the other, as well as the collaboration, as described herein.

Figure 8:
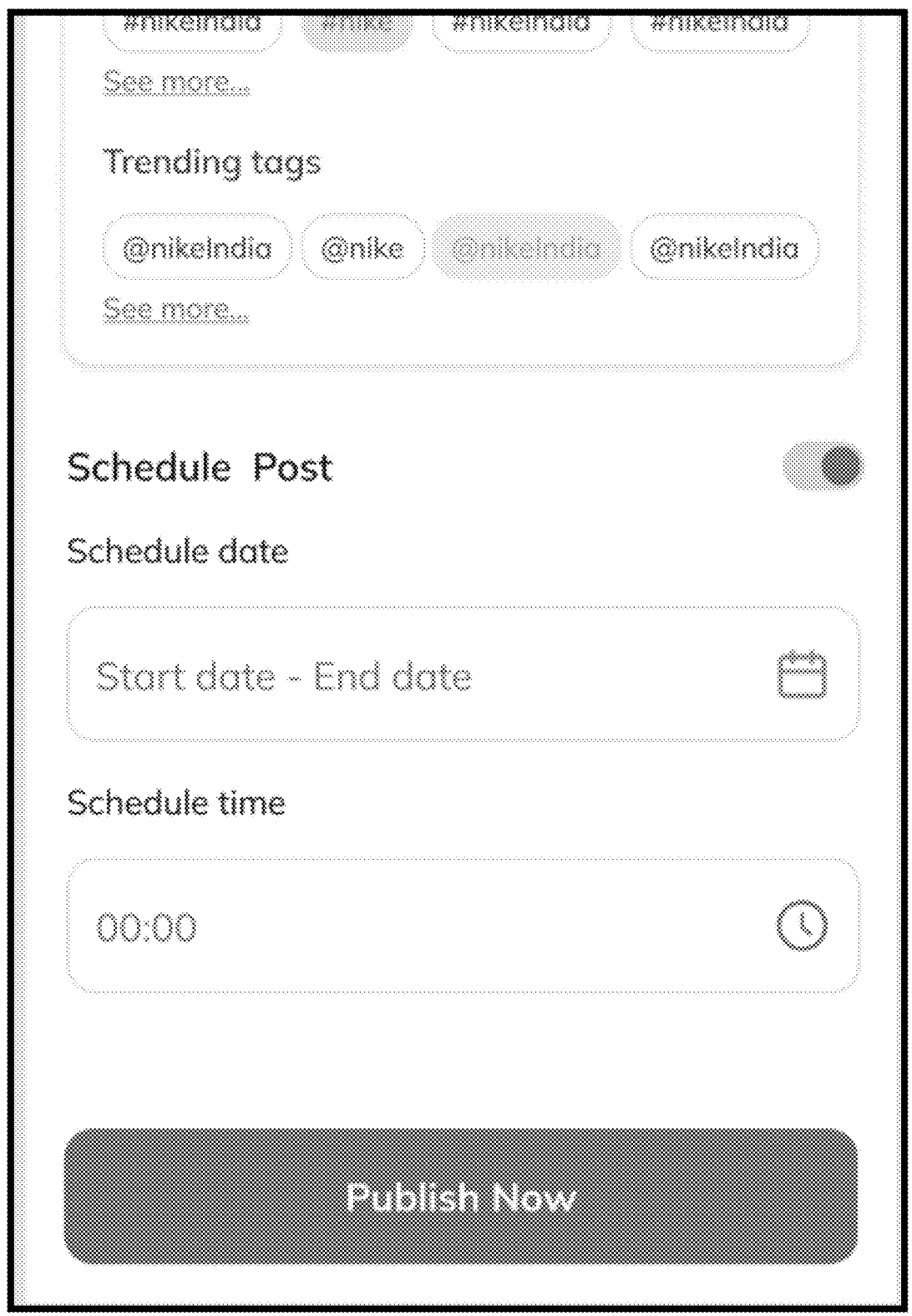
FIG. 8 is an exemplary interface for content scheduling via a content scheduling engine, according to an embodiment of the present invention.
Figure 9:
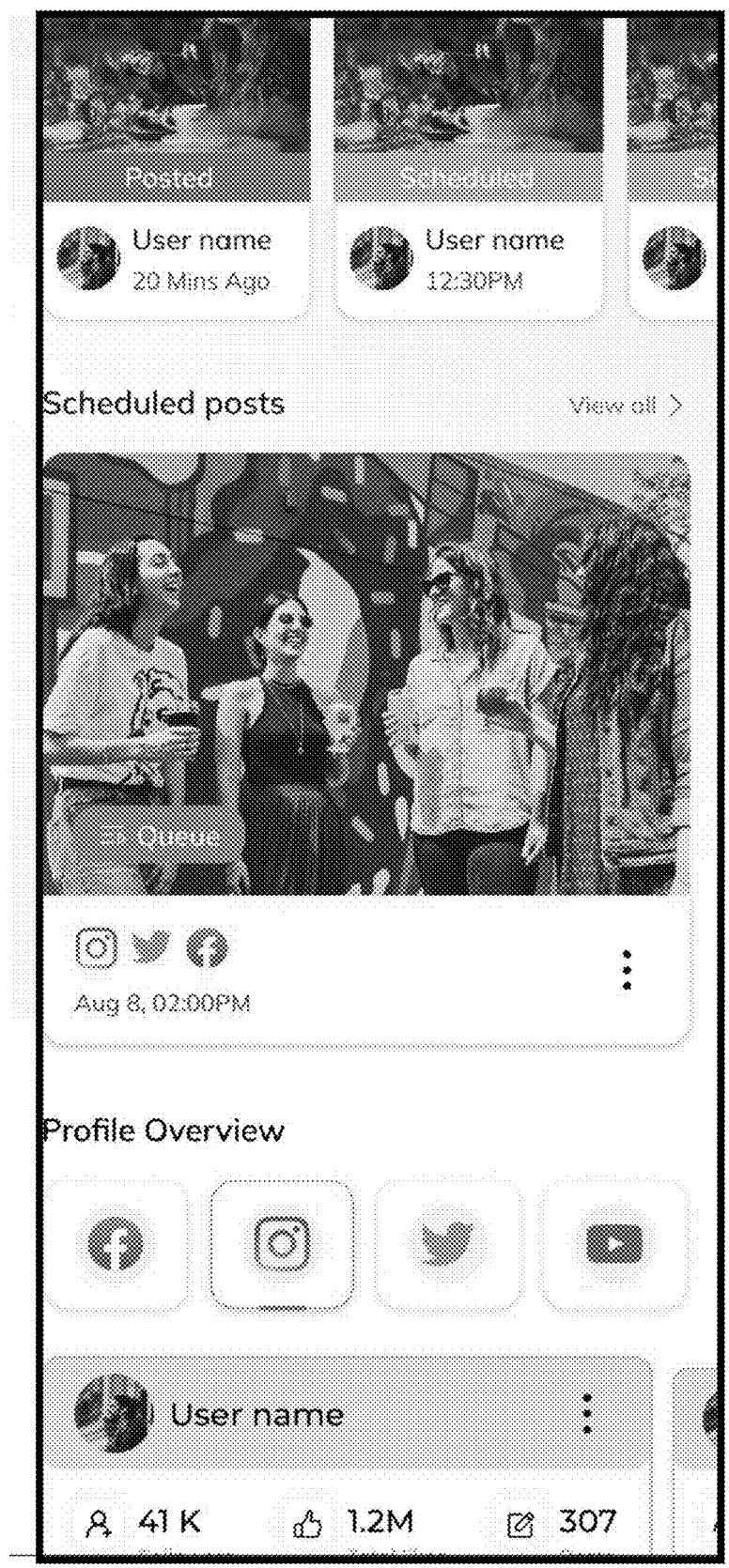
FIG. 9 is an exemplary interface for displaying scheduled and published content by a content queue management engine, according to an embodiment of the present invention.

While the embodiments described in steps of FIGS. 6, 7 and 8 relate to assisting brand owners 106 identify matching influencers 104, the same or similar steps can be utilized by influencers 104 to identify matching brand owners 106. For example, influencers 104 can utilize the matching engine 218 and/or the collaboration engine 222 to identify potential brand owners 106 which they would like to reach out to, communicate with, make proposals to, etc. in an effort to foster a collaboration.

While the principles of the disclosure have been illustrated in relation to the exemplary embodiments shown herein, the principles of the disclosure are not limited thereto and include any modification, variation, or permutation thereof

The invention claimed is:

1. A system for facilitating the creation and publishing of content across multiple social media networks, comprising:
a server including one or more processors;
a content scheduling engine executing on the server;
a content editing engine executing on the server;
a matching engine executing on the server a collaboration engine executing on the server;
a dashboard engine executing on the server;
an influencer database coupled to the server, the influencer database storing data related to a plurality of influencers;
a feedback database coupled to the server; and
software executing on the server, the software providing a graphical user interface (GUI) that is accessible on a computing device operated by a brand owner;
wherein the server is configured to:
receive, from the brand owner, a selection of a social media network where digital content is to be published from the GUI;
receive, from the brand owner, a selection of at least one search criteria related to the plurality of influencers from the GUI;
receive a selection of a budget for a marketing campaign from the GUI;
generate, via the matching engine, a short-list of influencers from the plurality of influencers by searching the influencer database to identify influencers that match the search criteria and the budget;
receive, via the collaboration engine and from the brand owner, a selection of an influencer from the short-list from the GUI;
facilitate, via the collaboration engine, the creation of digital content for the marketing campaign by the selected influencer and for the brand owner;
determine, via the content editing engine, a length of the created digital content;
determine a length limit of the selected social media network for content published on the selected social media network;
crop, via the content editing engine, the length of the created digital content to conform to the length limit of the selected social media network;
receive, via the matching engine and from the brand owner, a target audience for the created digital content;
receive, via the matching engine, a follower list of the influencer on the selected social media network, wherein each follower on the follower list currently follows the influencer;
generate, via the matching engine, a list of target users by identifying followers from the influencer's received follower list which match the target audience received from the brand owner;
publish, via the content scheduling engine, the created digital content to social media accounts on the social media network associated with each respective target user from the list of target users;
display, via the dashboard engine, engagement metrics related to the created digital content on the GUI; and
receive, via the GUI, feedback related to the influencer, wherein the feedback is stored in the feedback database; and
wherein the matching engine is configured to utilize the feedback for subsequent searches.

2. The system of claim 1, wherein the at least one search criteria is selected from a group consisting of previously published content, social media profile information, feedback, and engagement metrics.

3. The system of claim 1, wherein the content scheduling engine is configured to send the created digital content to a queue management engine executing on the server for publishing at a future time received from the computing device or for immediate publishing.

4. The system of claim 1, further comprising an audio engine executing on the server, wherein the server is further configured to receive a selection of an audio track from the computing device, and wherein the server is further configured to display, via the audio engine, a graphical overlay over the created digital content on the computing device, wherein the graphical overlay indicates a portion of the audio track equal to the length of the created digital content, and wherein the graphical overlay is slidable so that a different portion of the audio track equal to the length of the created digital content is selectable.

5. The system of claim 1, wherein the list of target users is further generated by identifying followers on respective follower lists of the followers on the influencer's follower list which match the target audience received from the brand owner.

6. A method for facilitating the creation and publishing of content across multiple social media networks implemented by a server including one or more processors and storage media storing machine-readable instructions, wherein the method is performed using the one or more processors, the method comprising:
- receiving, by the server and from a brand owner via a computing device operated by the brand owner, a selection of at least one social media network where digital content is to be published;
- receiving, by the server and from the brand owner via the computing device, a selection of at least one search criteria related to a plurality of influencers;
- receiving, by the server and from the brand owner via the computing device, a selection of a budget for a marketing campaign;
- generating, by a matching engine executing on the server, a short-list of influencers from the plurality of influencers by searching an influencer database coupled to the server to identify influencers that match the search criteria and budget, wherein the influencer database stores data related to the plurality of influencers;
- receiving, via a collaboration engine executing on the server and from the brand owner via the computing device, a selection of an influencer from short-list from the computing device;
- facilitating, via the collaboration engine, the creation of digital content for the marketing campaign by the selected influencer;
- determining, by a content editing engine executing on the server, a length of the created digital content;
- determining a length limit of the selected social media network for content published on the selected social media network;
- cropping, by the content editing engine, the length of the created digital content to conform to the length limit of the selected social media network;
- receiving, via the matching engine and from the brand owner via the computing device, a target audience for the created digital content;
- receiving, via the matching engine, a follower list of the influencer on the selected social media network, wherein each follower on the follower list currently follows the influencer;
- generating, by the matching engine, a list of target users by identifying followers from the influencer's received follower list which match the target audience received from the brand owner;
- publishing via a content scheduling engine executing on the server, the created digital content to social media accounts on the at least one social media network associated with each respective target user from the list of target users;
- displaying via a dashboard engine executing on the server, engagement metrics related to the created digital content on the computing device; and
- receiving, by the server feedback related to the influencer from the computing device, wherein the feedback is stored in the feedback database; and
- wherein the matching engine utilizes the feedback for subsequent searches.

7. The method of claim 6, wherein the at least one search criteria is selected from a group consisting of previously published content, social media profile information, feedback, and engagement metrics.

8. The method of claim 6, further comprising sending, via the content scheduling engine, the created digital content to a queue management engine executing on the server for publishing at a time received from the computing device, or for immediate publishing.

9. The method of claim 6, further comprising determining, by a tag generation engine executing on the server, a subject matter of the created digital content, and generating a list of trending hashtags related to the subject matter, wherein trending hashtags are determined based on statistical data exhibiting a rise in usage within a specific time period, wherein such usage is not consistent over time.

10. A system for facilitating the creation and publishing of content across multiple social media networks, comprising:
- a server including one or more processors;
- a content scheduling engine executing on the server;
- a content editing engine executing on the server;
- a matching engine executing on the server;
- a collaboration engine executing on the server:
- a dashboard engine executing on the server;
- an influencer database coupled to the server, the influencer database storing data related to a plurality of influencers;
- a feedback database coupled to the server; and
- software executing on the server, the software providing a graphical user interface (GUI) that is accessible on a computing device operated by a brand owner;
- wherein the server is configured to:
  - receive, from the brand owner, a selection of at least two social media networks where digital content is to be published from the GUI;
  - receive, from the brand owner, a selection of at least one search criteria related to the plurality of influencers from the GUI;
  - receive a selection of a budget for a marketing campaign from the GUI;
  - generate, via the matching engine, a short-list of influencers from the plurality of influencers by searching the influencer database to identify influencers that match the search criteria and the budget;
  - receive, via the collaboration engine and from the brand owner, a selection of an influencer from the short-list from the GUI;
  - facilitate, via the collaboration engine, the creation of digital content for the marketing campaign by the selected influencer and for the brand owner;
  - determine, via the content editing engine, a length of the created digital content;
  - determine a length limit of the selected social media network for content published on the selected social media network;
  - crop, via the content editing engine, the length of the created digital content to conform to the length limit of the selected social media network;
  - receive, via the matching engine and from the brand owner, a target audience for the created digital content;
  - receive, via the matching engine, a follower list of the influencer on the at least two selected social media networks, wherein each follower on the follower list currently follows the influencer;
  - generate, via the matching engine, a list of target users by identifying followers from the influencer's received follower list which match the target audience received from the brand owner;
  - publish, via the content scheduling engine, the created digital content to social media accounts on the at least two social media networks associated with each respective target user from the list of target users;

display, via the dashboard engine, engagement metrics related to the created digital content on the GUI; and receive, via the GUI, feedback related to the influencer, wherein the feedback is stored in the feedback database; and wherein the matching engine is configured to utilize the feedback for subsequent searches.

11. The system of claim 10, wherein the at least one search criteria is selected from a group consisting of previously published content, social media profile information, feedback, and engagement metrics.

12. The system of claim 10, wherein the content scheduling engine is configured to send the created digital content to a queue management engine executing on the server for publishing at a time received from the computing device, or for immediate publishing.

13. The system of claim 10, wherein the server is further configured to determine a subject matter of the created digital content, and generate a list of popular hashtags related to the subject matter, wherein popular hashtags are consistently used over time.

\* \* \* \* \*